(12) United States Patent
Donnelly

(10) Patent No.: US 11,447,943 B2
(45) Date of Patent: Sep. 20, 2022

(54) PIPE CONNECTOR

(71) Applicant: Maax Bath Inc., Lachine (CA)

(72) Inventor: Steve Donnelly, Saint-Antoine-de-Tilly (CA)

(73) Assignee: Maax Bath Inc., Lachine (CA)

( * ) Notice: Subject to any disclaimer, the term of this patent is extended or adjusted under 35 U.S.C. 154(b) by 526 days.

(21) Appl. No.: 16/575,583

(22) Filed: Sep. 19, 2019

(65) Prior Publication Data

US 2020/0011043 A1 Jan. 9, 2020

Related U.S. Application Data

(62) Division of application No. 14/523,003, filed on Oct. 24, 2014, now Pat. No. 10,465,370.

(60) Provisional application No. 61/895,515, filed on Oct. 25, 2013.

(51) Int. Cl.
| *E03D 11/16* | (2006.01) |
| *B23P 15/00* | (2006.01) |
| *F16L 5/02* | (2006.01) |
| *F16L 5/12* | (2006.01) |
| *F16L 27/12* | (2006.01) |
| *E03C 1/12* | (2006.01) |

(52) U.S. Cl.
CPC .............. *E03D 11/16* (2013.01); *B23P 15/00* (2013.01); *F16L 5/025* (2013.01); *F16L 5/027* (2013.01); *F16L 5/12* (2013.01); *F16L 27/1275* (2019.08); *E03C 1/12* (2013.01)

(58) Field of Classification Search
CPC .......... E03D 11/16; B23P 15/00; F16L 5/025; F16L 5/027; F16L 5/12; F16L 27/1275; E03C 1/12
See application file for complete search history.

(56) References Cited

U.S. PATENT DOCUMENTS

| 1,031,531 | A | * | 7/1912 | Cramer | ................... E03D 11/16 285/60 |
| 1,044,457 | A | | 11/1912 | Jaeger | |
| 3,192,614 | A | | 7/1965 | Gardner | |
| 3,224,014 | A | | 12/1965 | Pietrzak | |
| 3,311,391 | A | | 3/1967 | Harrell | |
| 5,695,222 | A | * | 12/1997 | Hodges | ................... E03D 11/16 285/15 |
| 6,694,566 | B1 | * | 2/2004 | Mockett | ................... F16L 5/00 174/152 G |

(Continued)

*Primary Examiner* — Lawrence Averick
(74) *Attorney, Agent, or Firm* — Bradley Arant Boult Cummings; Phillip E. Walker; Timothy L. Capria

(57) ABSTRACT

There is described a pipe connector for connecting first and second pipes slidably engageable one into the other, the pipe connector comprising: a side wall extending between a first end and a second end along a longitudinal axis and defining an interior space, the side wall being adapted to be inserted into a floor hole made into a floor; a floor flange extending laterally and outwardly from the first end of the side wall, the floor flange being adapted to rest on a floor surface when the side wall is inserted into the floor hole; and a guiding assembly secured to the side wall and comprising at least one resilient retaining finger for receiving the first pipe therebetween, the at least one resilient retaining finger being securable to the first pipe when the second pipe is engaged into the first pipe.

23 Claims, 18 Drawing Sheets

(56) References Cited

U.S. PATENT DOCUMENTS

| | | | | |
|---|---|---|---|---|
| 6,719,294 | B2* | 4/2004 | Nguyen | F16L 21/025 |
| | | | | 4/252.5 |
| 9,551,138 | B2* | 1/2017 | McLeod | F16L 17/025 |
| 2001/0045710 | A1* | 11/2001 | Nguyen | F16L 21/025 |
| | | | | 277/604 |
| 2004/0251682 | A1 | 12/2004 | Pyron | |
| 2006/0170208 | A1 | 8/2006 | Arning et al. | |
| 2014/0259384 | A1* | 9/2014 | McLeod | F16L 17/025 |
| | | | | 4/679 |
| 2015/0115596 | A1* | 4/2015 | Donnelly | B23P 15/00 |
| | | | | 285/42 |

\* cited by examiner

PIPE CONNECTOR

CROSS-REFERENCE TO RELATED APPLICATIONS

This application claims priority of US Provisional Patent Application having Ser. No. 61/895,515, which was filed on Oct. 25, 2013 and is entitled "Pipe connector", the specification of which is hereby incorporated by reference.

TECHNICAL FIELD

The present invention relates to the field of pipe connectors for bathtubs, and particularly to pipe connectors and methods for connecting freestanding bathtubs to discharge pipes.

BACKGROUND

Freestanding bathtubs are in high demand because of their aesthetic characteristics. However, one of the drawbacks associated with freestanding bathtubs is their installation, which is generally more complicated than for conventional bathtubs.

Since typical freestanding bathtubs are mounted on a finished surface of a floor, their installation must be preceded by the installation and positioning of drain and water supply pipes under the surface of the floor, the installation of a subfloor and the installation of a floor covering. The plumbing professional must therefore be present at the time of the installation of the drain and water supply pipe under the floor, and must come back at a later stage of the construction (i.e. once the finishing of the floor is completed) to install the freestanding bathtub.

In addition, the installation of a freestanding bathtub is generally made more complicated because of the connection of the drain and water supply pipes. More specifically, freestanding bathtubs generally comprise faucets mounted in decorative shells and pre-assembled drain and overflow mounted on the tub, and the access between the skirt and tub is limited. The plumbing professional thus needs to remove a portion of the ceiling on a lower floor level to access the pipes (which increases the costs of installation due to reconstruction).

It would therefore be advantageous to be provided with a device or method that alleviates at least some of the drawbacks generally associated with the installation of freestanding bathtubs.

SUMMARY

According to a first broad aspect, there is provided a pipe connector for connecting first and second pipes slidably engageable one into the other, the pipe connector comprising: a side wall extending between a first end and a second end along a longitudinal axis and defining an interior space, the side wall being adapted to be inserted into a floor hole made into a floor; a floor flange extending laterally and outwardly from the first end of the side wall, the floor flange being adapted to rest on a floor surface when the side wall is inserted into the floor hole; and a guiding assembly secured to the side wall and comprising at least one resilient retaining finger for receiving the first pipe therebetween, the at least one resilient retaining finger being securable to the first pipe when the second pipe is engaged into the first pipe.

In one embodiment, the guiding assembly extends within the interior space of the side wall.

In one embodiment, the pipe connector further comprises a bottom wall secured to the second end of the side wall, the bottom wall having a pipe aperture therethrough for receiving the first pipe, the guiding structure extending from the bottom wall towards the first end of the side wall and being aligned with the pipe aperture so that the first pipe can be inserted into the guiding structure via the pipe aperture.

In one embodiment, the at least one resilient retaining finger comprises a lower end connected to the bottom wall, a top end and a finger flange extending inwardly therefrom at the top end, the first pipe abutting against the finger flange when inserted in the guiding assembly.

In one embodiment, a side aperture is defined in at least a portion of the flange and a portion of the side wall.

In another embodiment, the at least one resilient retaining finger extends along the longitudinal axis away from the first end of the side wall, the at least one resilient retaining finger extending between a top end secured to the side wall and a bottom end.

In one embodiment, the side wall comprises a truncated conical portion and a cylindrical portion, the truncated conical portion being secured to the floor flange and extending along the longitudinal axis from the first end of the side wall towards the guiding assembly, and the cylindrical portion extending along the longitudinal axis from the truncated conical portion towards the guiding assembly and being secured to the truncated conical portion and the guiding assembly.

In one embodiment, the pipe connector further comprises an abutment flange extending inwardly from an internal surface of the cylindrical portion of the side wall, the first pipe abutting against the finger flange when inserted in the guiding assembly.

In one embodiment, the pipe connector further comprises a plurality of blades each extending radially from truncated conical portion adjacent to the floor flange.

In one embodiment, the pipe connector further comprises at least one guiding protrusion extending from a top surface of the floor flange, the at least one guiding protrusion being engageable with at least one respective hole in a bathtub skirt for positioning the bathtub skirt relative to the pipe connector.

In one embodiment, the at least one resilient retaining finger is securable to the first pipe using one of a hose clamp, a spring clamp, and a cable tie.

In one embodiment, the floor flange comprises a plurality of holes each for receiving a screw therethrough in order to secure the flange to the floor.

In one embodiment, the first pipe comprises a female part of a slip joint, and the second pipe comprises a male part of the slip joint.

According to another broad aspect, there is provided a pipe connector for connecting first and second pipes slidably engageable one into the other, the pipe connector comprising: a side wall extending between a first end and a second end along a longitudinal axis and defining an interior space, the side wall being adapted to be inserted into a floor hole made into a floor; a floor flange extending laterally and outwardly from the first end of the side wall, the floor flange being adapted to rest on a floor surface when the side wall is inserted into the floor hole; a guiding assembly secured to the side wall and comprising at least one resilient retaining finger for receiving the first pipe therebetween, the at least one resilient retaining finger being securable to the first pipe when the second pipe is engaged into the first pipe; and a securing member for tightening the at least one resilient retaining finger against the first pipe.

In one embodiment, the guiding assembly extends within the interior space of the side wall.

In one embodiment, the pipe connector further comprises a bottom wall secured to the second end of the side wall, the bottom wall having a pipe aperture therethrough for receiving the first pipe, the guiding structure extending from the bottom wall towards the first end of the side wall and being aligned with the pipe aperture so that the first pipe can be inserted into the guiding structure via the pipe aperture.

In one embodiment, the at least one resilient retaining finger comprises a lower end connected to the bottom wall, a top end and a finger flange extending inwardly therefrom at the top end, the first pipe abutting against the finger flange when inserted in the guiding assembly.

In one embodiment, a side aperture is defined in at least a portion of the flange and a portion of the side wall.

In another embodiment, the at least one resilient retaining finger extends along the longitudinal axis away from the first end of the side wall, the at least one resilient retaining finger extending between a top end secured to the side wall and a bottom end.

In one embodiment, the side wall comprises a truncated conical portion and a cylindrical portion, the truncated conical portion being secured to the floor flange and extending along the longitudinal axis from the first end of the side wall towards the guiding assembly, and the cylindrical portion extending along the longitudinal axis from the truncated conical portion towards the guiding assembly and being secured to the truncated conical portion and the guiding assembly.

In one embodiment, the pipe connector further comprises an abutment flange extending inwardly from an internal surface of the cylindrical portion of the side wall, the first pipe abutting against the finger flange when inserted in the guiding assembly.

In one embodiment, the pipe connector further comprises a plurality of blades each extending radially from truncated conical portion adjacent to the floor flange.

In one embodiment, the pipe connector further comprises at least one guiding protrusion extending from a top surface of the floor flange, the at least one guiding protrusion being engageable with at least one respective hole in a bathtub skirt for positioning the bathtub skirt relative to the pipe connector.

In one embodiment, the securing member comprises one of a hose clamp, a spring clamp, and a cable tie.

In one embodiment, the floor flange comprises a plurality of holes each for receiving a screw therethrough in order to secure the flange to the floor.

In one embodiment, the first pipe comprises a female part of a slip joint, and the second pipe comprises a male part of the slip joint.

According to a further broad aspect, there is provided a method of connecting together first and second pipes slidably engageable one into the other, the method comprising: inserting the pipe connector of claim 1 in a hole made in a floor until the flange abuts a surface of the floor; securing the flange to the floor; inserting the first pipe into the guiding assembly; securing the at least one resilient retaining finger of the guiding assembly against the first pipe; and engaging the second pipe into the first pipe.

In one embodiment, the step of securing the flange to the floor comprises screwing screws in the floor through holes present in the floor flange.

In one embodiment, the step of inserting the first pipe into the guiding assembly comprises inserting the first pipe between the at least one resilient retaining finger In one embodiment, the step of engaging the second pipe into the first pipe comprises inserting the second in the interior space of the side wall and sliding the second pipe into the first pipe.

The term "pipe" refers to any device used to convey a fluid such as water. A pipe may be a tube, a duct, a conduit, a part of a slip joint, a pipe extension, or the like. It should be understood that a pipe may be made of any adequate material such as a rigid material or a semi-rigid material.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

FIGS. 1 to 6 illustrate one embodiment of a pipe connector 10 for connecting a first pipe 12 and a second pipe 14 together and allowing the passage of a fluid therebetween. The pipe 12 is to be connected, directly or indirectly, to a bathtub (not shown) such as a freestanding bathtub, and the second pipe 14 is to be connected, directly or indirectly, to an evacuation pipe or drain (not shown) which is itself typically connected to a sewer (not shown). The pipes 12 and 14 are adapted to be inserted one into the other. In the embodiment illustrated in FIG. 1, the pipe 12 is a male part of a slip joint that can be inserted into the pipe 14, which is a female part of the slip joint. However, the person skilled in the art will understand that the pipe 14 and the pipe 12 may be the male part and the female part of the slip joint, respectively.

In one embodiment, the pipe connector 10 is adapted to be inserted into a hole defined in a floor on which a bathtub is to be placed and secured. Once inserted in the floor hole, the pipe connector 10 is fixedly secured to the floor, using screws, construction adhesive and/or the like. The pipe connector 10 is adapted to receive the first and second pipes 12 and 14 while the pipe 12 is inserted at least partially into the pipe 14, and to maintain the position of the pipes 12 and 14 relative to the floor.

Figure 1:
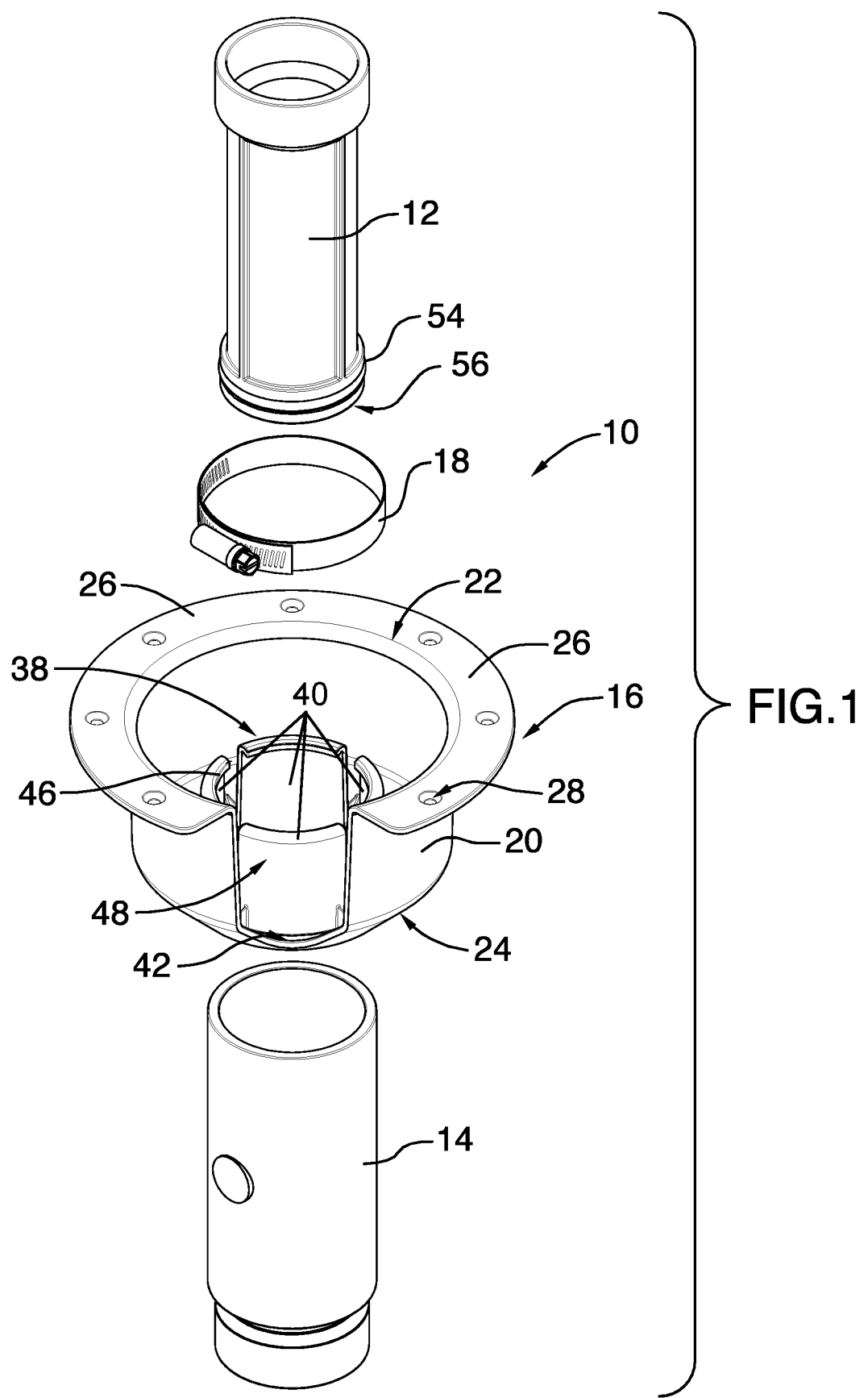
FIG. 1 is an exploded view of a connector assembly comprising a pipe connector, a clamping member and two pipes to be connected together, in accordance with a first embodiment.
Figure 2:
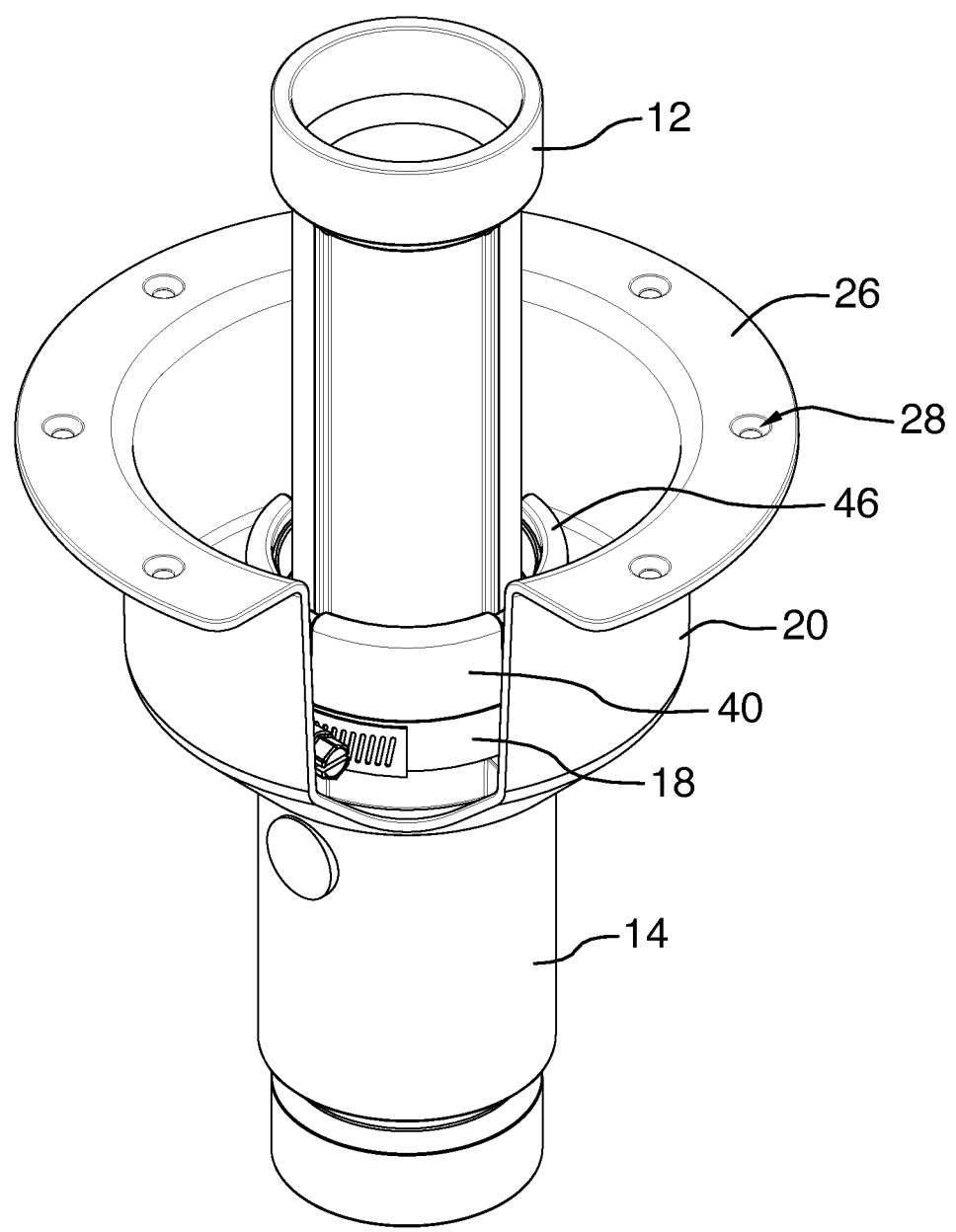
FIG. 2 is a top perspective view of the connector assembly of FIG. 1 with the pipe connector, the clamping member and the two pipes assembled.

As illustrated in FIG. 1, the pipe connector 10 comprises a body 16 and a clamping device 18. In the illustrated embodiment, the body 16 includes an external, generally cylindrical side wall 20 extending along a longitudinal axis between a first or top end 22 and a second or bottom end 24 to define a cavity or interior space therein. The top end 22 defines an aperture through which the first pipe 12 can be inserted, as it will become apparent below. A flange 26 extends laterally and outwardly from the first end 22 of the side wall 20. The flange 26 extends along at least a portion of the perimeter of the first end 22 of the side wall 20. The flange 26 has a plurality of holes 28 distributed along a surface thereof and extending through a thickness thereof.

Figure 3:
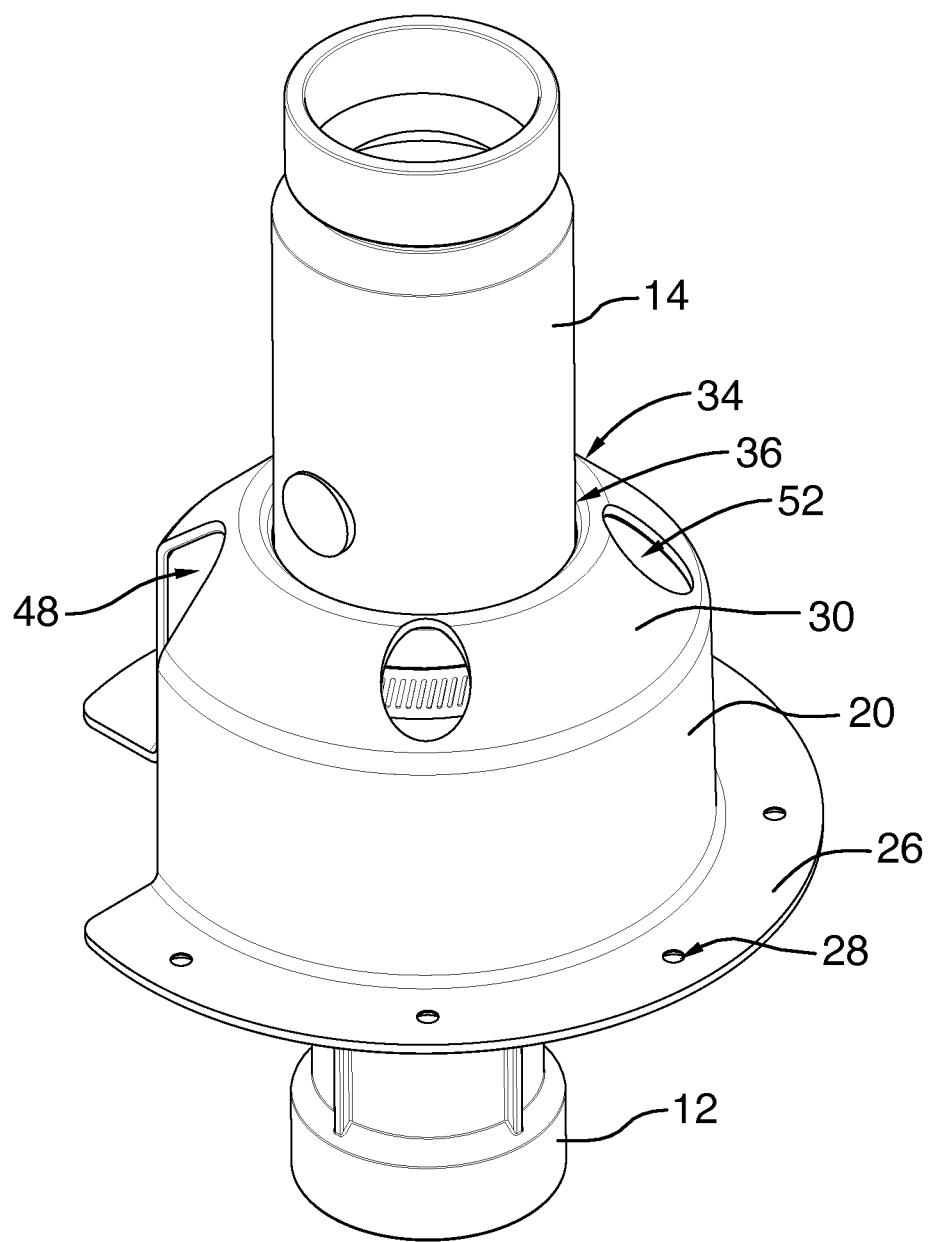
FIG. 3 is a bottom perspective of the connector assembly of FIG. 1 with the pipe connector, the clamping member and the two pipes assembled.
Figure 4:
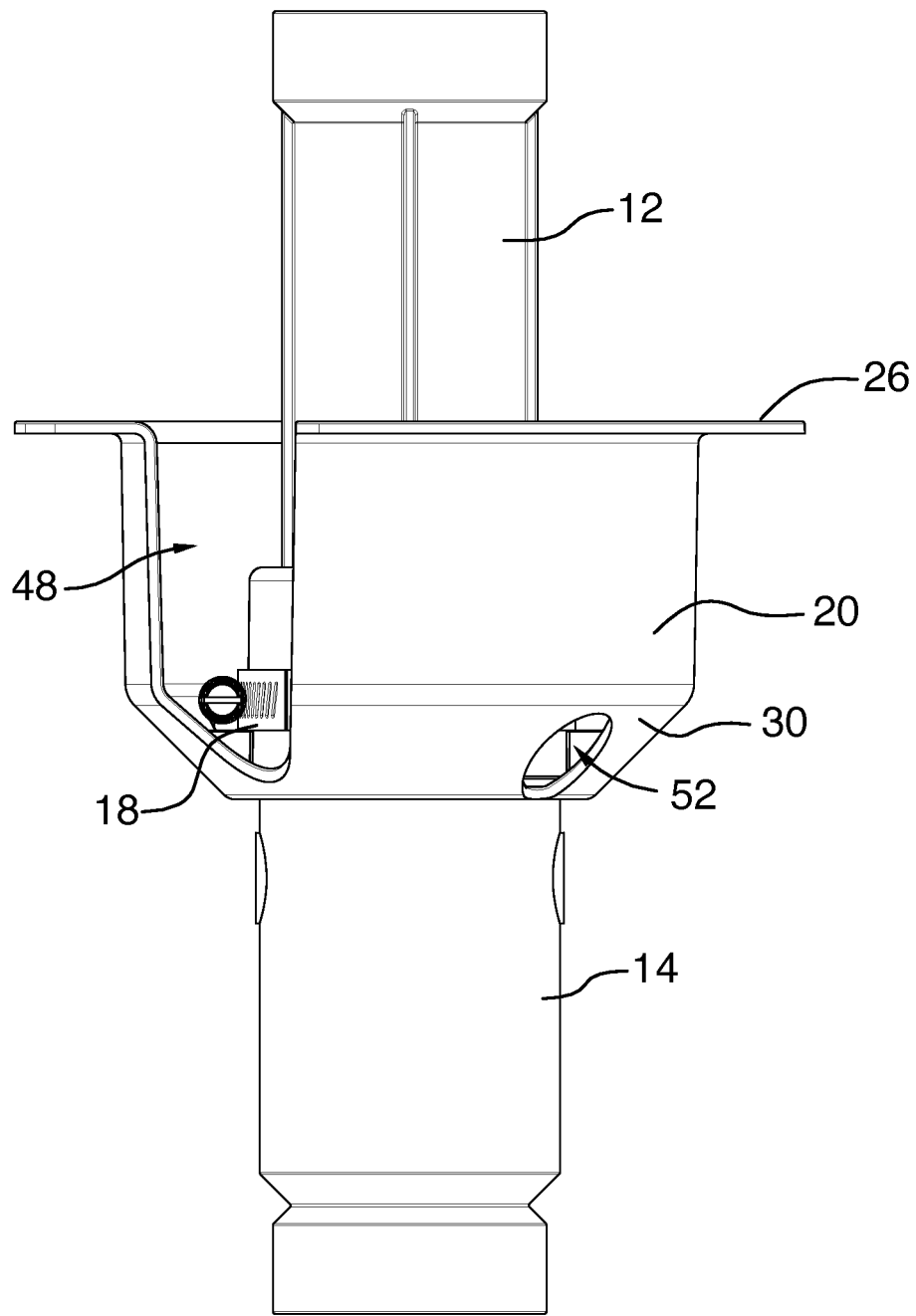
FIG. 4 is a first side view of the connector assembly of FIG. 1 with the pipe connector, the clamping member and the two pipes assembled.
Figure 5:
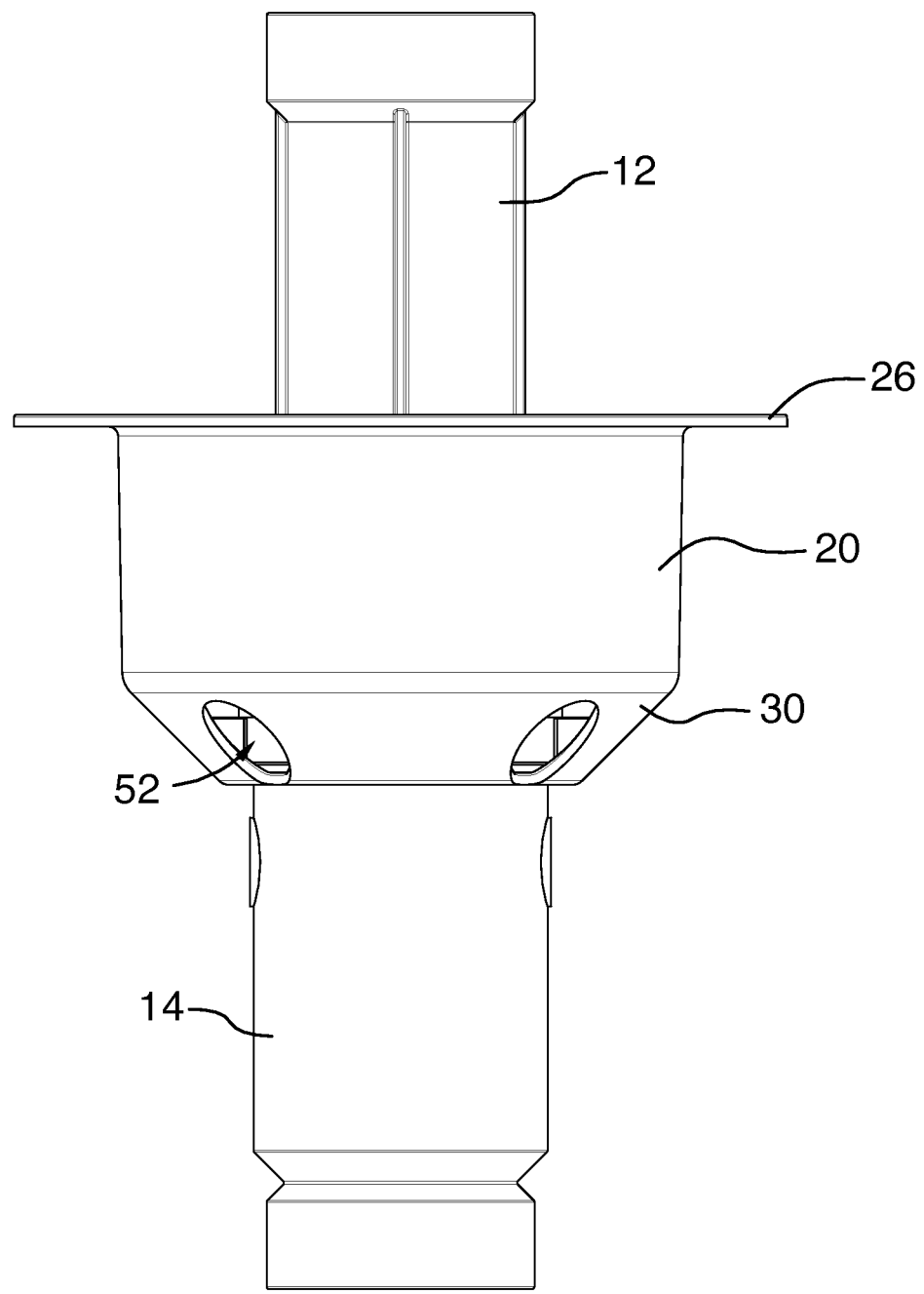
FIG. 5 is a second side view of the connector assembly of FIG. 1 with the pipe connector, the clamping member and the two pipes assembled.

A bottom wall 30 having a truncated conical shape extends from the bottom end 24 of the side wall 20. As illustrated in FIG. 3, the top end of the bottom wall 30 is connected to the bottom end 24 of the side wall 20, and the bottom end 34 of the bottom wall 30 defines a central hole 36 through which the second pipe 14 may be inserted, as best described below.

The pipe body 16 further comprises a guiding assembly 38 that extends, concentrically to the side wall 20, in the interior space defined by the side wall 20, from the bottom wall 30 towards the top end 22 of the connector body 16. In the illustrated embodiment, the guiding assembly 38 comprises four resilient retaining fingers 40 that are substantially evenly distributed about the circumference of the hole 36. The resilient fingers 40 are spaced apart from one another and each define an arc of a circle such that the space defined between four retaining fingers 40 has a substantially cylindrical shape. More specifically, each retaining finger 40 has a circular arc cross-sectional shape and the radius of curvature of the circular arc substantially corresponds to that of the hole 36. Each retaining finger 40 extends substantially upwardly, parallel to the longitudinal axis from the bottom wall 30 towards the top end 22 of the side wall 20. The bottom end 42 of each retaining finger 40 is fixedly secured to the bottom wall 30 in the vicinity of the hole 36. The fingers 40 form together a substantially cylindrical cavity or aperture in which the pipe 14 is to be inserted. In one embodiment, the diameter of the cavity or aperture formed by the fingers 40 substantially corresponds to the external diameter of the pipe 14.

A flange 46 extends inwardly and laterally from the top end 44 of each retaining finger 40. Each flange 46 has a circular arc cross-sectional shape and the radius of curvature of the circular arc substantially corresponds to that of the pipe 12. In one embodiment, the flanges 46 define a substantially circular aperture of which the diameter substantially corresponds to the external diameter of the pipe 12. The length of the flange 46 is substantially equal to or less than the thickness of the pipe 12. It should be understood that the length of the flanges 46 is chosen so that the pipe 14 may abut against the flanges 46 when inserted between the fingers 40. Each retaining finger 40 is resilient so that its top end 44 may move in radial direction, inwardly and outwardly, while its bottom end 42 is fixedly secured to the bottom wall 30. Therefore, the space defined between the flanges 46 of the fingers 40 is adjustable.

As illustrated in FIG. 1, the connector body 16 further includes a side aperture 48 that extends through the flange 26 and the side wall 20, and partially through the bottom wall 30. In addition to the central aperture 36, the bottom wall 30 is further provided with three secondary holes 52. In one embodiment, the side aperture 48 may be optional.

In the following and with reference to FIGS. 7 to 14, there is described one embodiment of a method for installing a freestanding bathtub while using the pipe connector 10.

In order to install the pipe connector 10, a hole is first made in the floor 80 that will receive the bathtub 82. The location of the floor hole is selected with respect to the desired position for the bathtub 82. For example, the position of the hole may be chosen so that the center of the waste, overflow, or discharge pipe of the bathtub, once installed, be vertically aligned with the center of the hole 36 once the pipe connector 10 is inserted into the floor hole. In another example, the position of the floor hole is chosen so that the center of the floor hole be substantially vertically aligned with the center of the discharge pipe of the bathtub 82, once installed.

Figure 7:
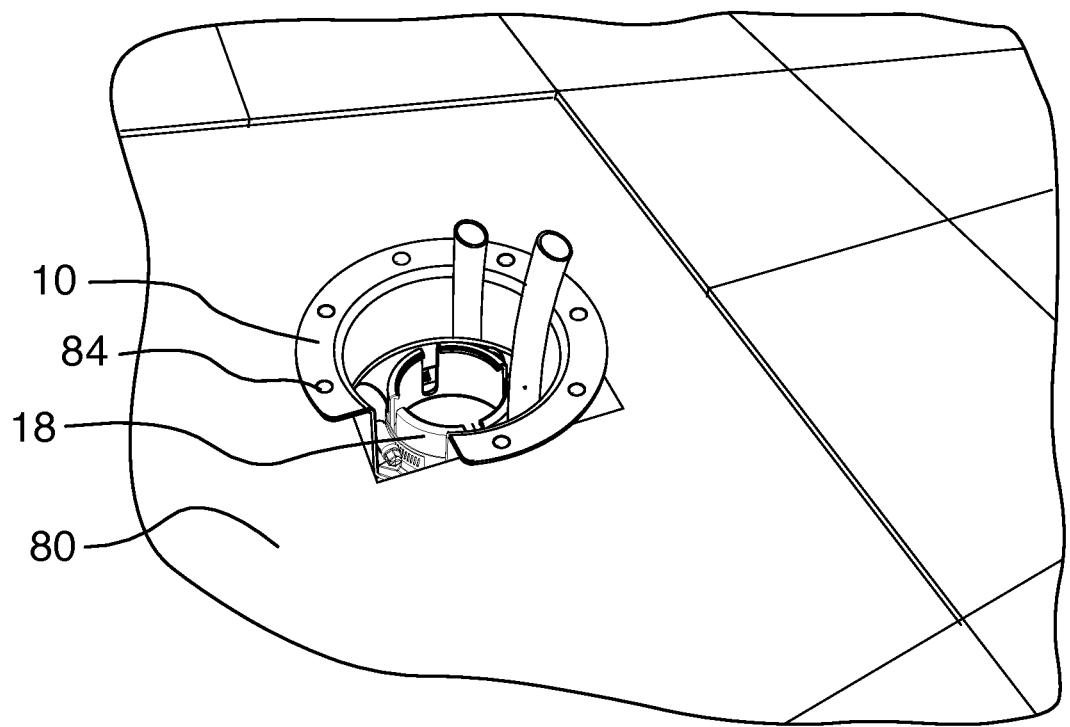
FIG. 7 illustrates a pipe connector inserted into a hole in a floor, in accordance with an embodiment.

The dimensions of the floor hole are chosen so that the side wall 20 be inserted into the floor hole while the flange 26 may abut the top surface of the floor 80 surrounding the floor hole. Once the pipe connector 10 is inserted in the floor hole, the flange 26 rests on the top surface of the floor 80. The pipe connector 10 is then fixedly secured to the floor by screwing screws 84 through the holes 28, as illustrated in FIG. 7. It should be understood that any proper method to fixedly secure the pipe connector 10 to the floor 80 may be used. For example, the holes 28 through the flange 26 may be omitted and the flange 26 may be secured to the floor 80 using a construction adhesive or the like.

Figure 6:
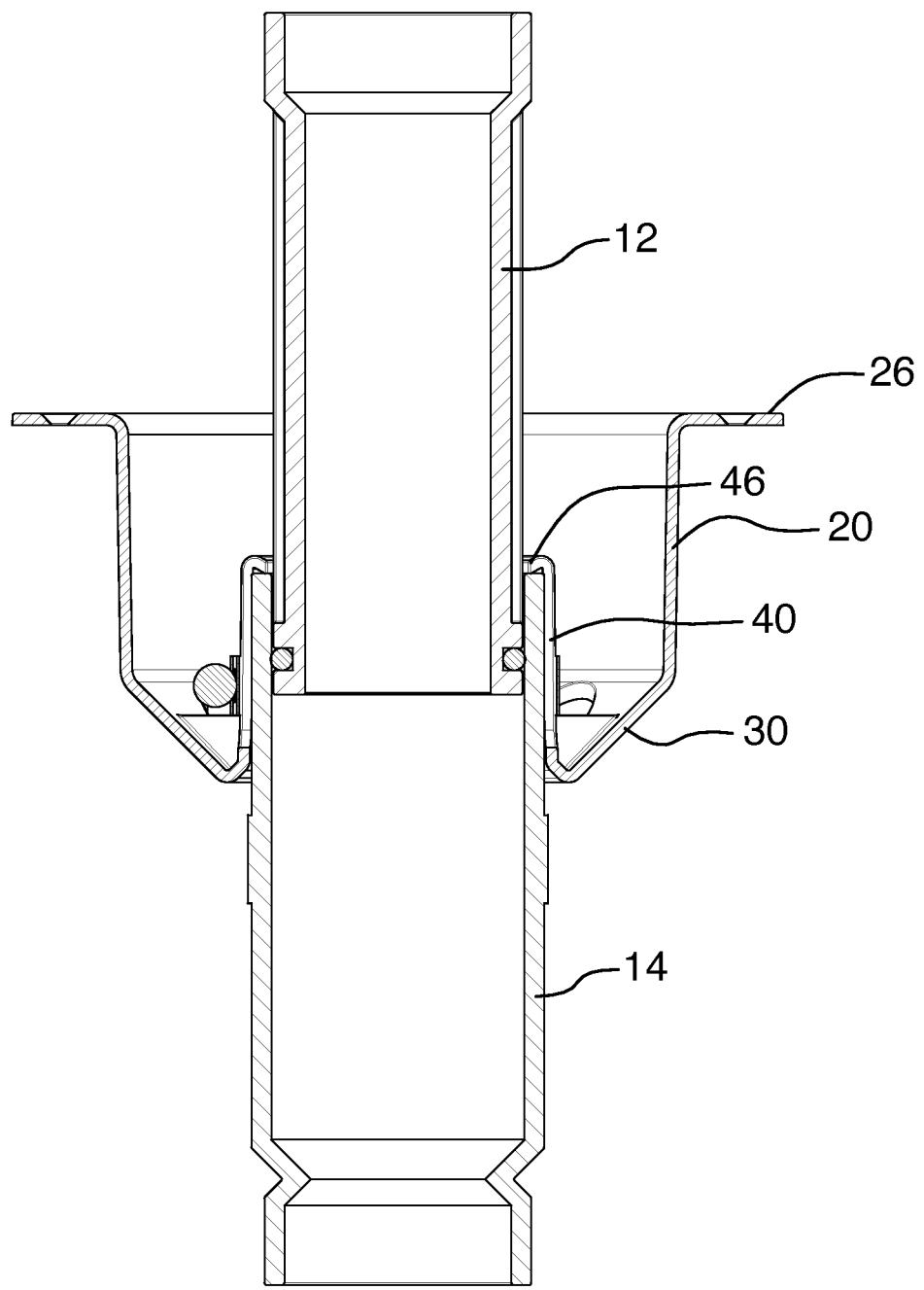
FIG. 6 is a cross-sectional side view of the connector assembly of FIG. 1 with the pipe connector, the clamping member and the two pipes assembles together.
Figure 8:
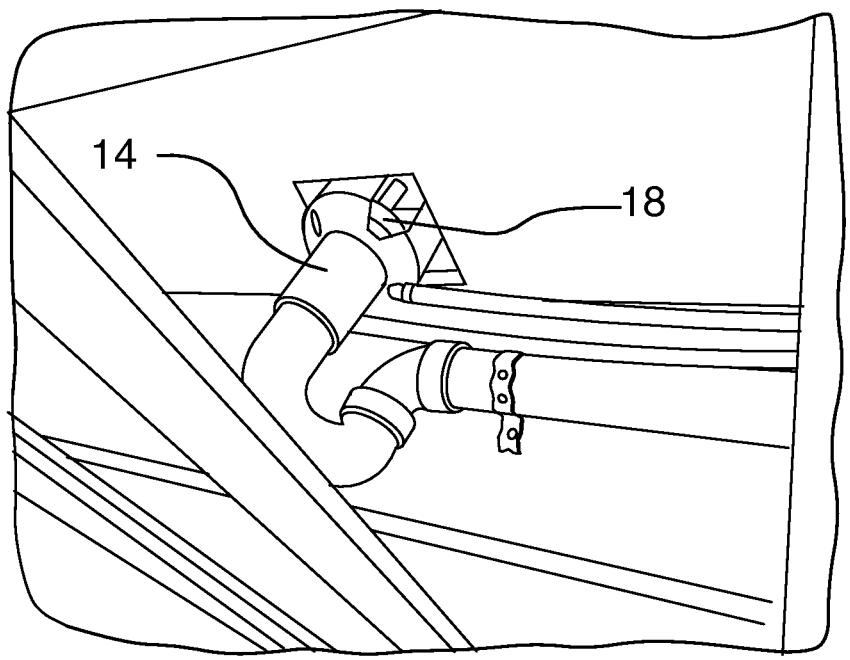
FIG. 8 illustrates the pipe connector of the FIG. 7 connected to a female part of a slip joint.

Once the flange 26 has been secured to the floor 80, the pipe 14 is inserted upwardly into the guiding assembly 38. For example, the pipe 14 may be the female part of a slip joint, as illustrated in FIGS. 1 to 6. The pipe 14 slides into the guiding assembly 38 until abutting against the flanges 46 of the retaining fingers 40. The hose clamp 18 is then inserted around the guiding assembly 38, and tightened in order to secure the pipe 14 to the guiding assembly 38, as illustrated in FIGS. 7 and 8. The hose clamp 18 may be screwed to be tightened using a screwdriver, and the screwdriver may access the hose clamp 18 through the side aperture 48 present in the side wall 20. The cold water inlet pipe and the hot water inlet pipe are also inserted through the secondary holes 52, as illustrated in FIG. 6.

In one embodiment, it will be appreciated that the side aperture 48 renders the side wall 20 slightly deformable. The side wall 20 may then be inserted into a floor hole that would not be perfectly circular. The side wall 20 may then also be inserted into a floor hole of which the diameter would be slightly larger than that of the side wall 20.

Figure 9:
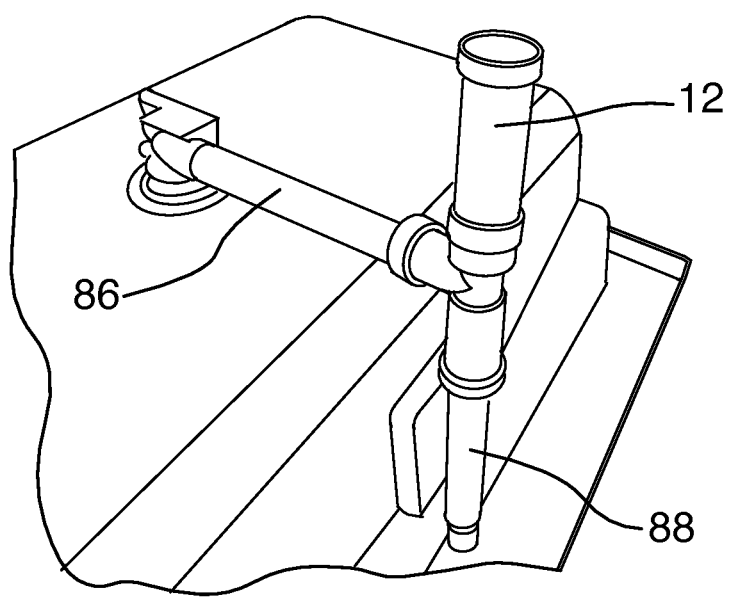
FIG. 9 illustrates a male part of a slip joint connected to a bathtub, in accordance with an embodiment.
Figure 10:
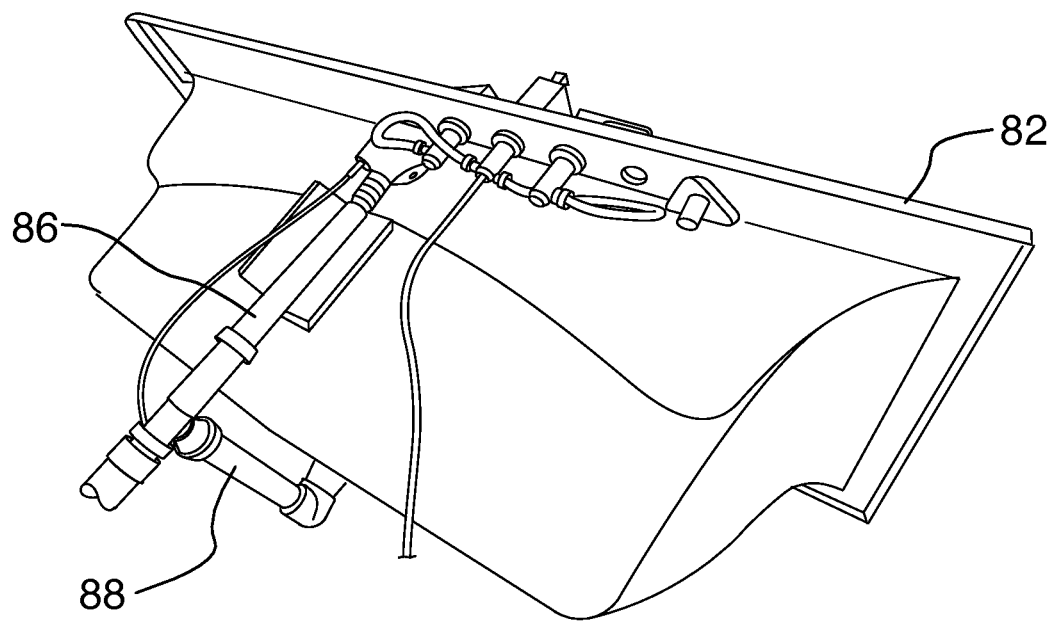
FIG. 10 illustrates the bathtub of FIG. 9 to which a faucet is connected, in accordance with an embodiment.

FIGS. 9 and 10 illustrate the preparation of the bathtub 82. At this step, the faucet is installed on the bathtub, a discharge pipe 86 is fluidly connected to the bathtub drain, and an overflow pipe 88 is also connected to the overflow of the bathtub. Then, the pipe 12, i.e. the male part of the slip joint, is fluidly connected to the discharge pipe 86 and the overflow pipe 88 using a fluidic T-connector.

Figure 11:
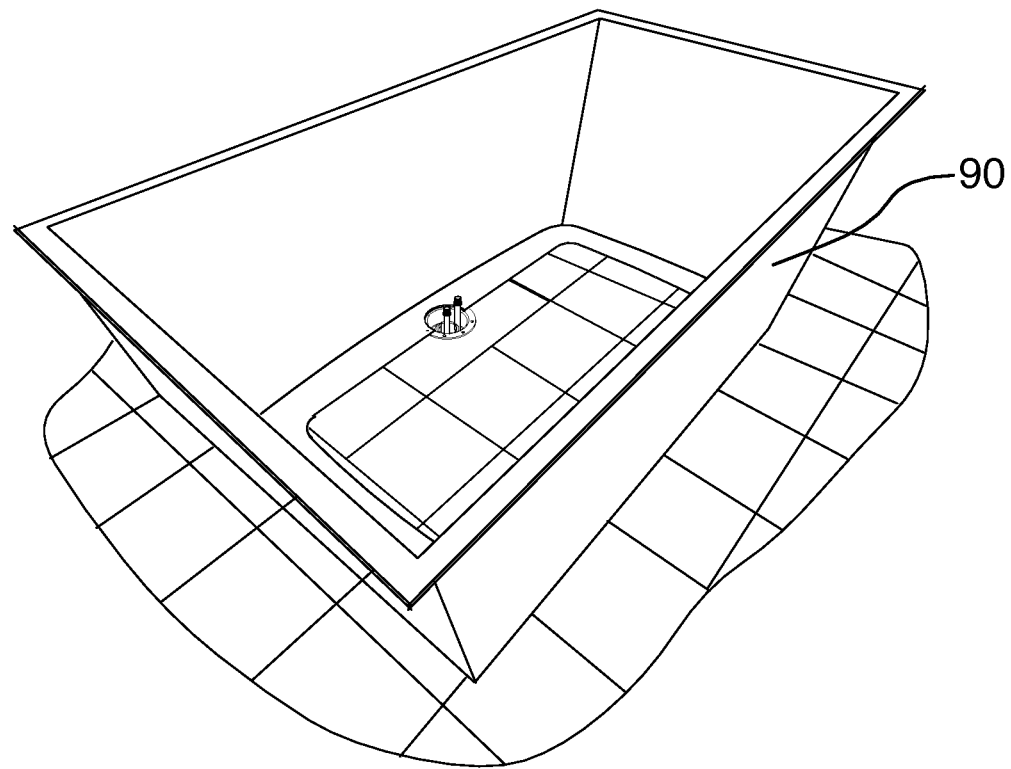
FIG. 11 illustrates a skirt for receiving the bathtub of FIG. 9, in accordance with an embodiment.
Figure 12:
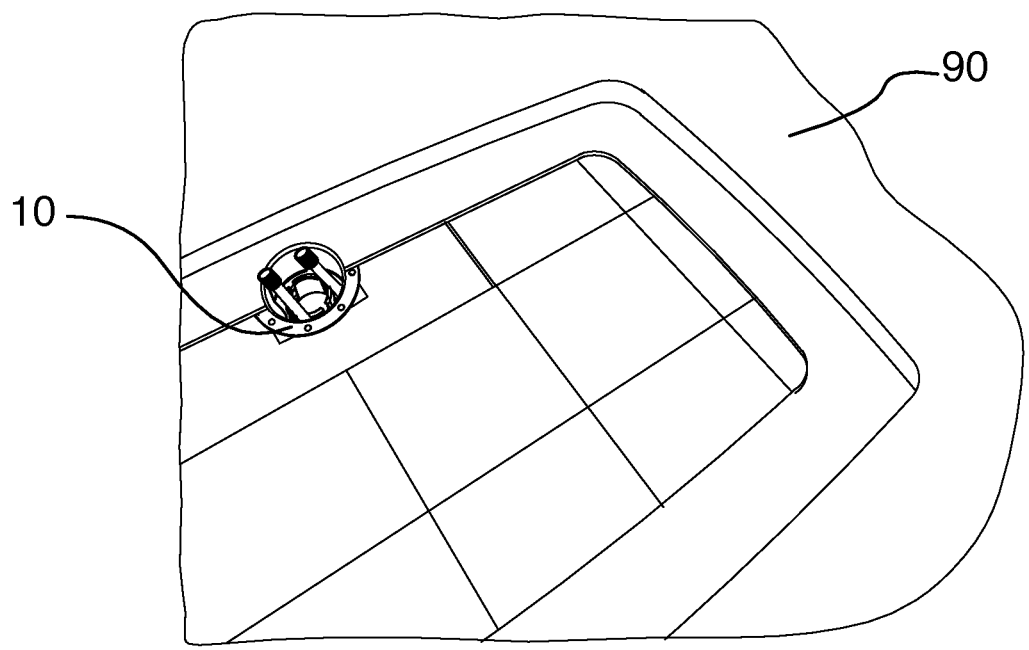
FIG. 12 illustrates the relative positioning of the skirt of FIG. 11 and a pipe connector secured to a floor, in accordance with an embodiment.

Then, the skirt 90 of the bathtub 82 is placed on the floor and positioned adequately with respect to the pipe connector 10 secured to the floor 80, as illustrated in FIG. 11. The skirt 90 is then fixedly secured to the floor 80. For example, the skirt 90 may be screwed to the floor 80. A sealing joint is further applied to the skirt, as illustrated in FIG. 12.

Figure 13:
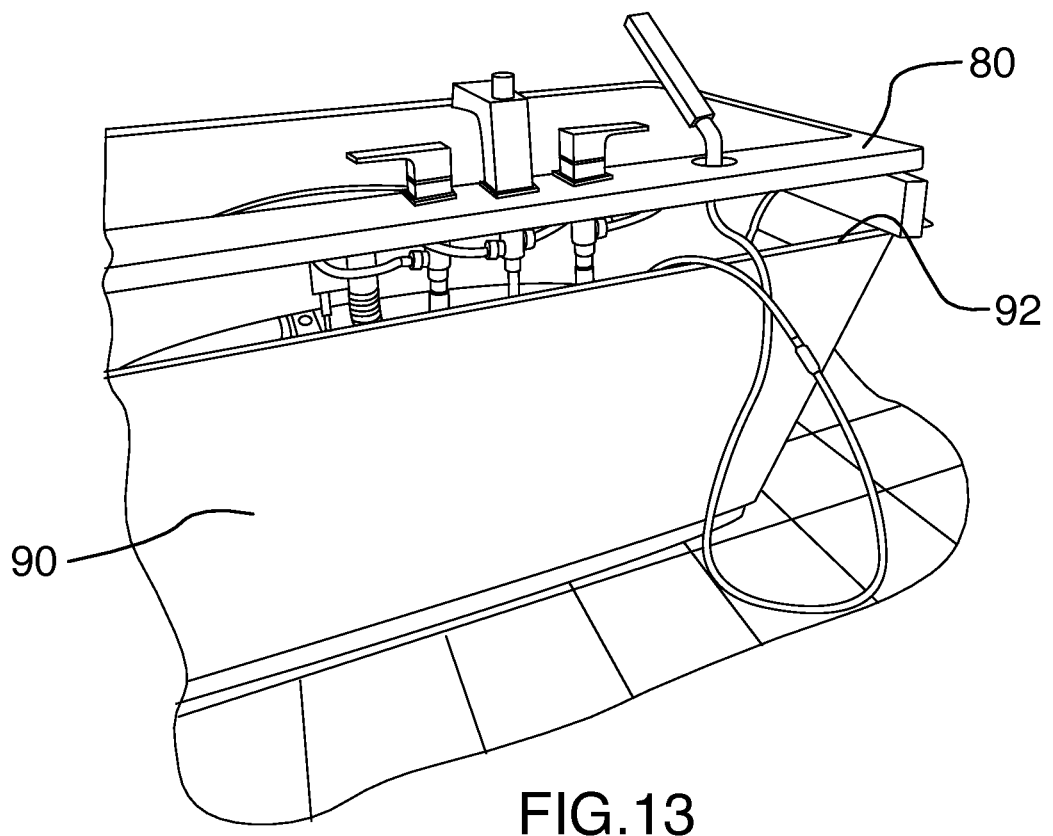
FIG. 13 illustrates the bathtub of FIG. 10 partially inserted in the skirt of FIG. 11 and placed on spacers positioned on top of the skirt, in accordance with an embodiment.
Figure 14:
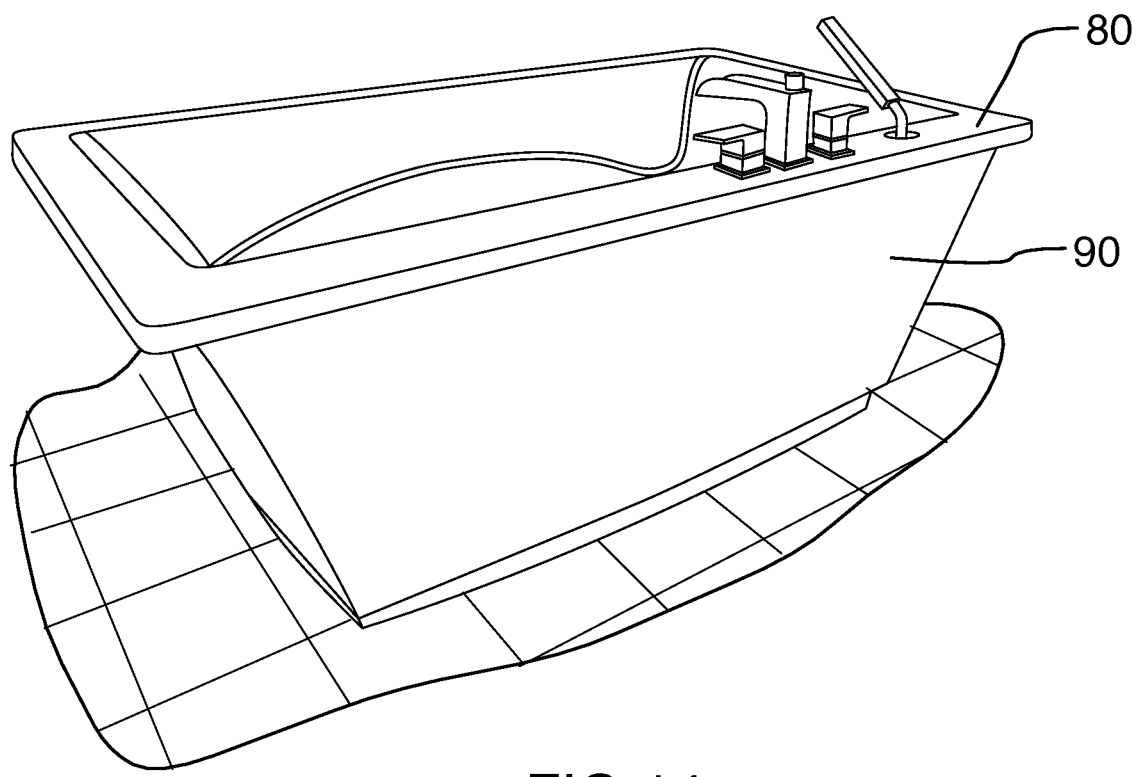
FIG. 14 illustrates the bathtub of FIG. 10 installed within the skirt of FIG. 11.

Spacers 92 are then positioned on the top end of the skirt 90 and the bathtub 82 is positioned on the spacers 92 to be partially inserted into the skirt 90, as illustrated in FIG. 13. While the bathtub 82 is positioned on the spacers 92, the pipe 12, i.e. the male part of the slip joint, is inserted into the pipe 14. The drain installation can then be tested to determine whether there is any water leakage. If there is no leakage, the spacers may be removed and the bathtub 82 may be directly deposited on top of the skirt 90, as illustrated in FIG. 14.

The person skilled in the art will appreciate that the sequence of steps for installing the bathtub may vary. For example, the first step may consist in inserting the pipe 14 in the guiding assembly 38 of the pipe connector 10. The second step may consist in securing the retaining fingers 40 against the pipe 14. Then, the pipe 12 is engaged into the pipe 14, and the pipe connector 10 with the pipes 12 and 14 connected thereto is then inserted into the floor hole. Finally, the flange 26 is secured to the floor.

In one embodiment, the pipe 12 is provided with an O-ring or toric joint 54 which extends along a circumference of the external surface of the pipe 12 in the vicinity of a bottom end 56 of the pipe 12. The bottom end 56 of the pipe 12 is inserted into the pipe 14 between the flanges 46 of the retaining fingers 40. The exterior diameter of the pipe 12 is selected so that the pipe 12 may fit into the pipe 14. The O-Ring 54 is in compression when the bottom end 56 of the pipe 12 is inserted into the pipe 14, thereby exerting pressure on the internal surface of the pipe 14 and the external surface of the pipe 12. As a result of the pressure exerted by the O-ring 54 being in compression, the pipes 12 and 14 are substantially secured together so that their relative position is substantially fixed. The O-ring 54 further acts as a sealing joint to prevent any fluid leakage from the pipe 12 towards the pipe 14.

In one embodiment, the hose clamp 18 is positioned along the guiding assembly 38 to face a portion of the pipe 12 inserted into the pipe 14. The hose clamp 18 may be positioned to be in alignment with the O-ring 54 or in the vicinity of the O-ring 54 in order to further increase the compression of the O-ring 54, thereby further securing the pipes 12 and 14 together.

Figure 15:
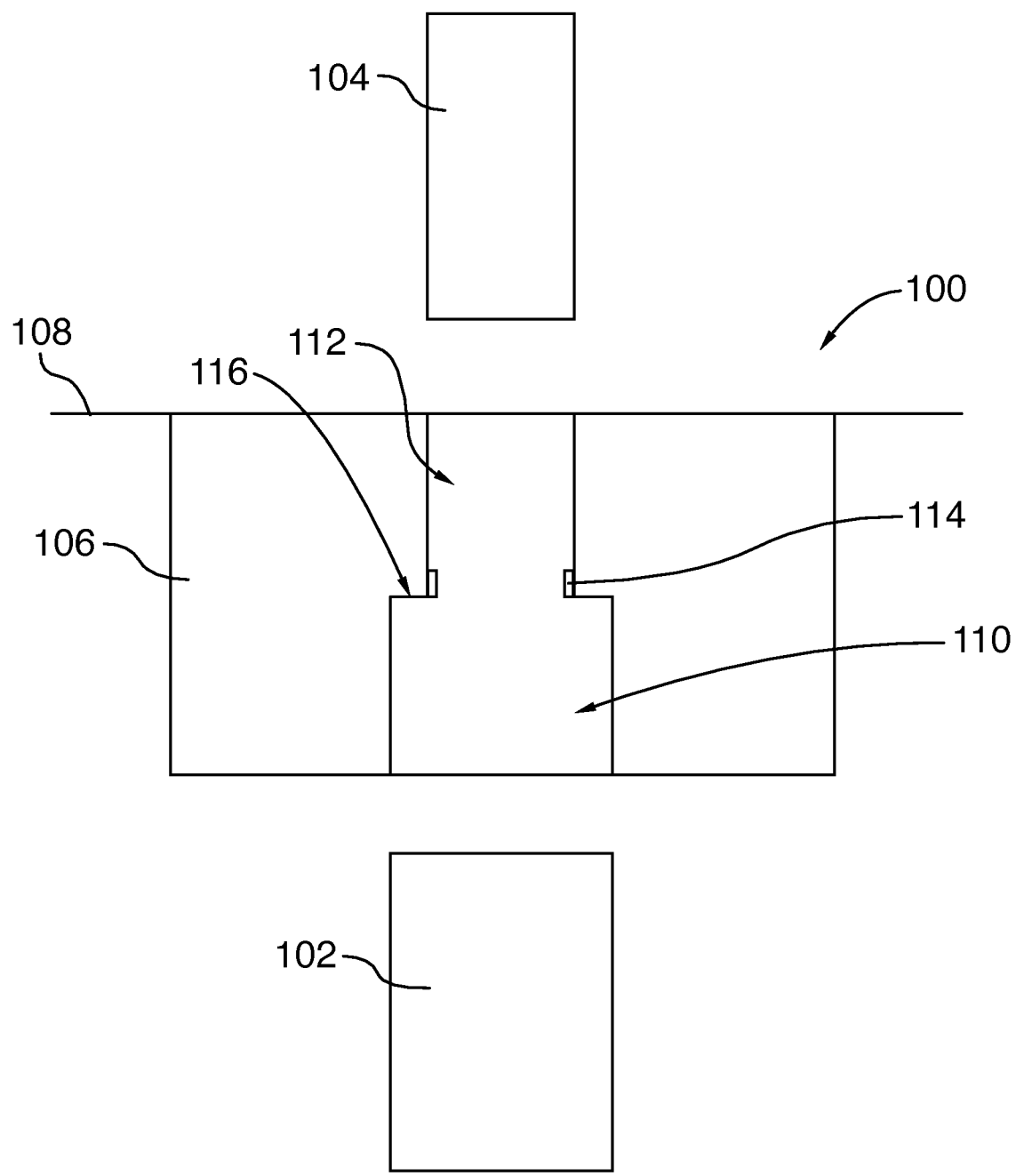
FIG. 15 is a cross-sectional view of a pipe connector of the prior art.
Figure 16:
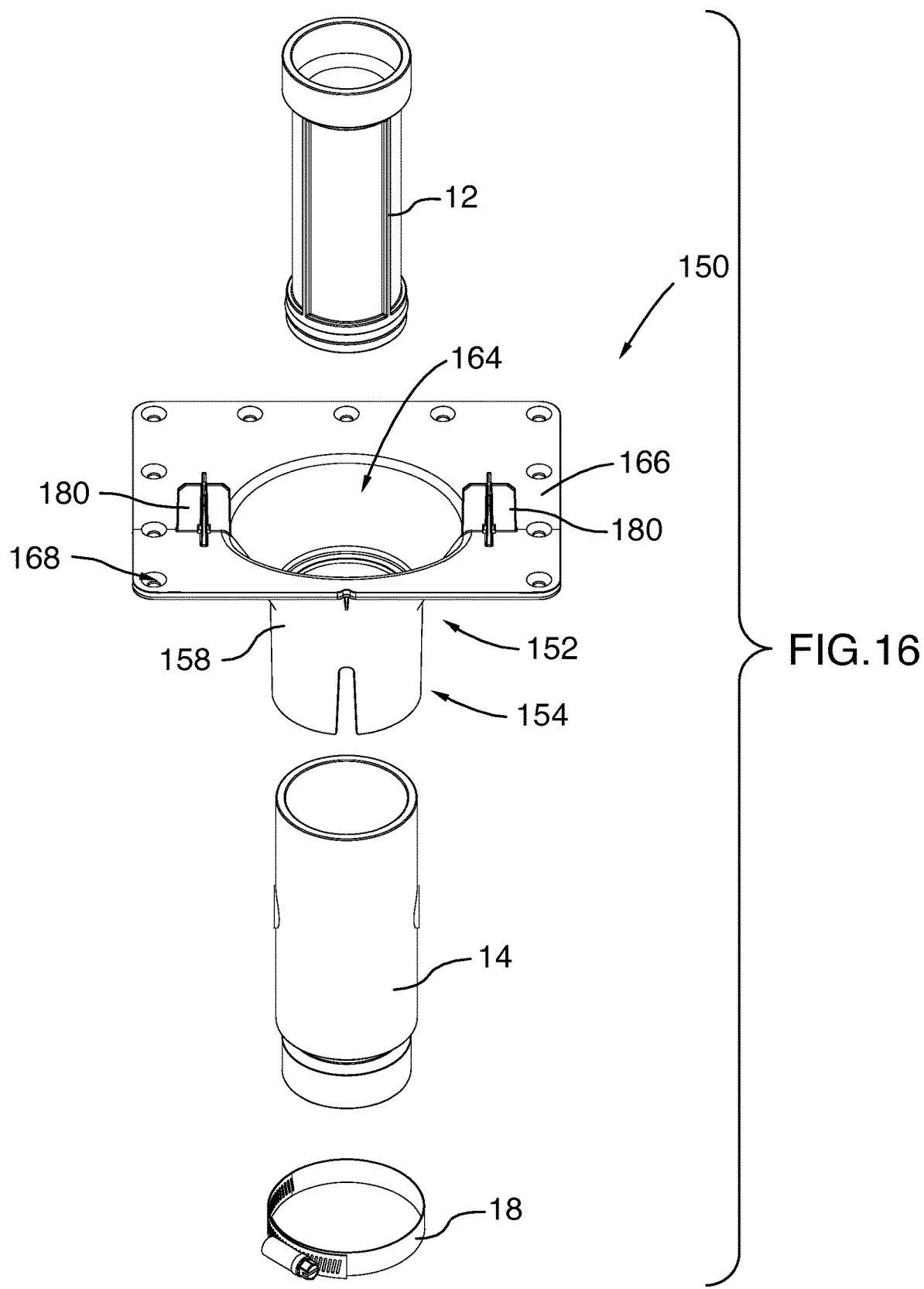
FIG. 16 is an exploded view of a connector assembly comprising a pipe connector, a clamping member and two pipes to be connected together, in accordance with a second embodiment.
Figure 17:
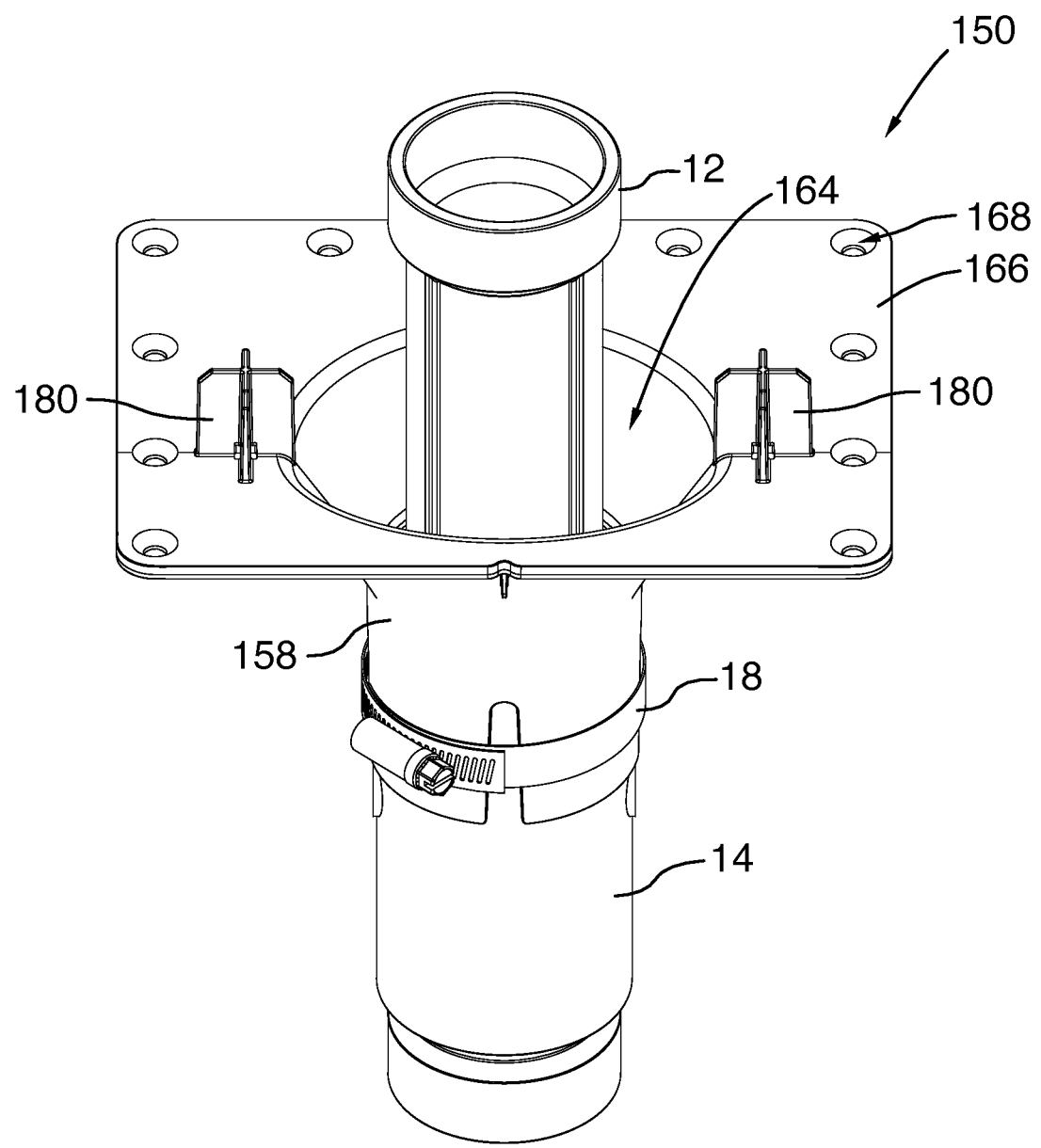
FIG. 17 is a top perspective view of the connector assembly of FIG. 16 with the pipe connector, the clamping member and the two pipes assembled.
Figure 18:
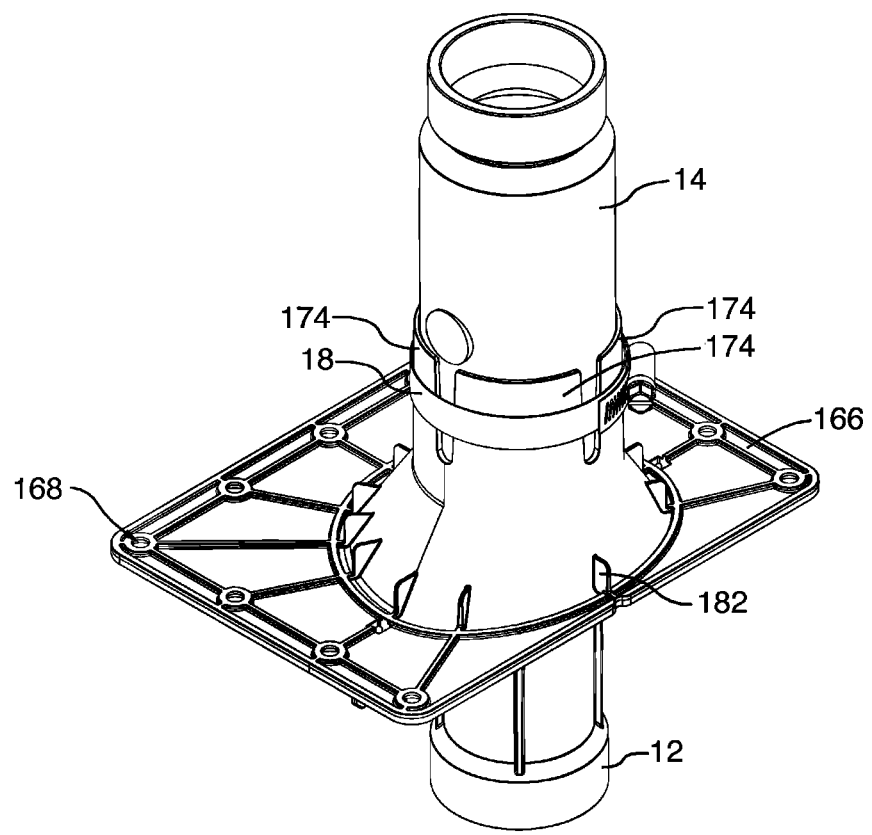
FIG. 18 is a bottom perspective of the connector assembly of FIG. 16 with the pipe connector, the clamping member and the two pipes assembled.
Figure 19:
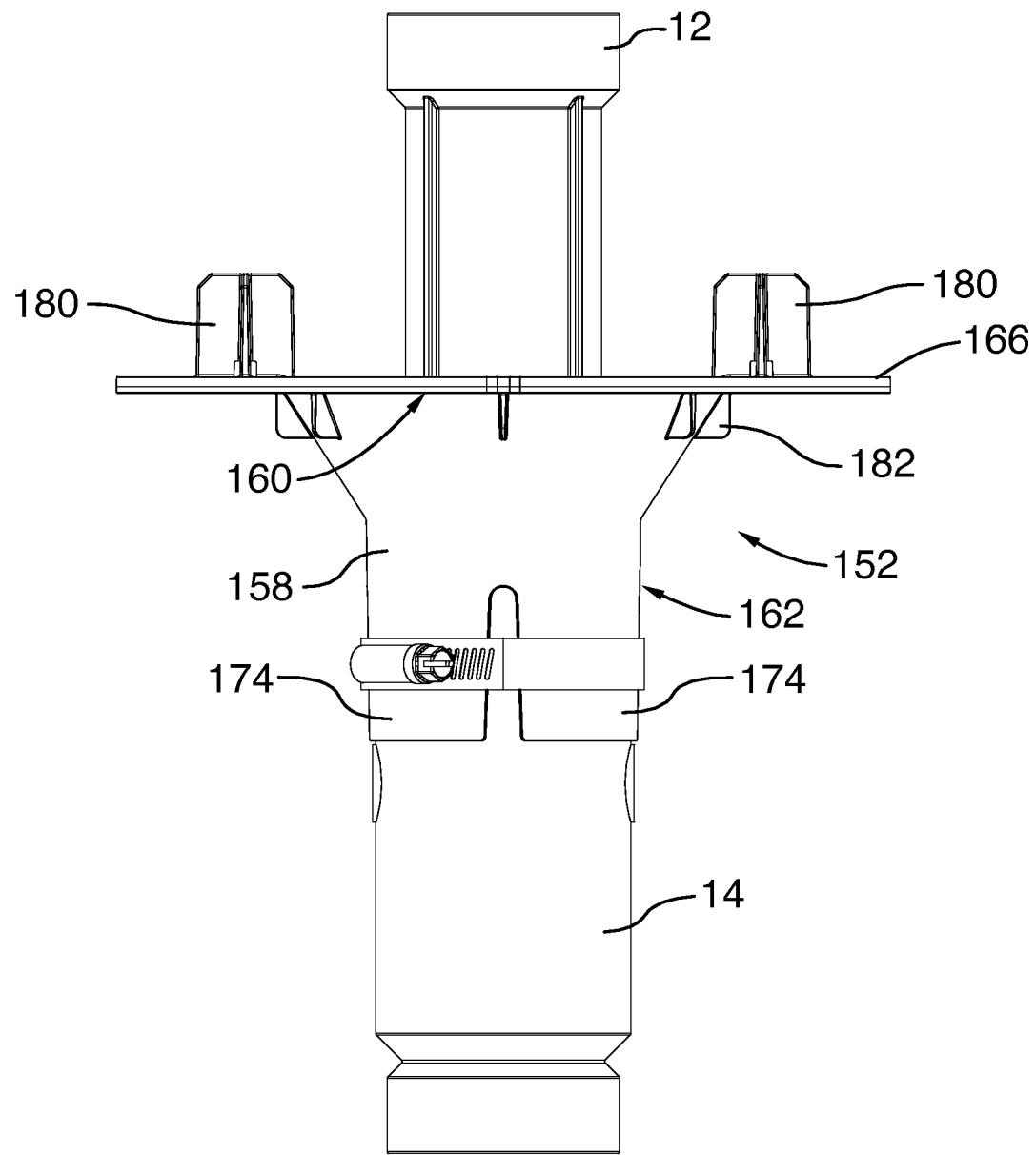
FIG. 19 is a first side view of the connector assembly of FIG. 16 with the pipe connector, the clamping member and the two pipes assembled.
Figure 20:
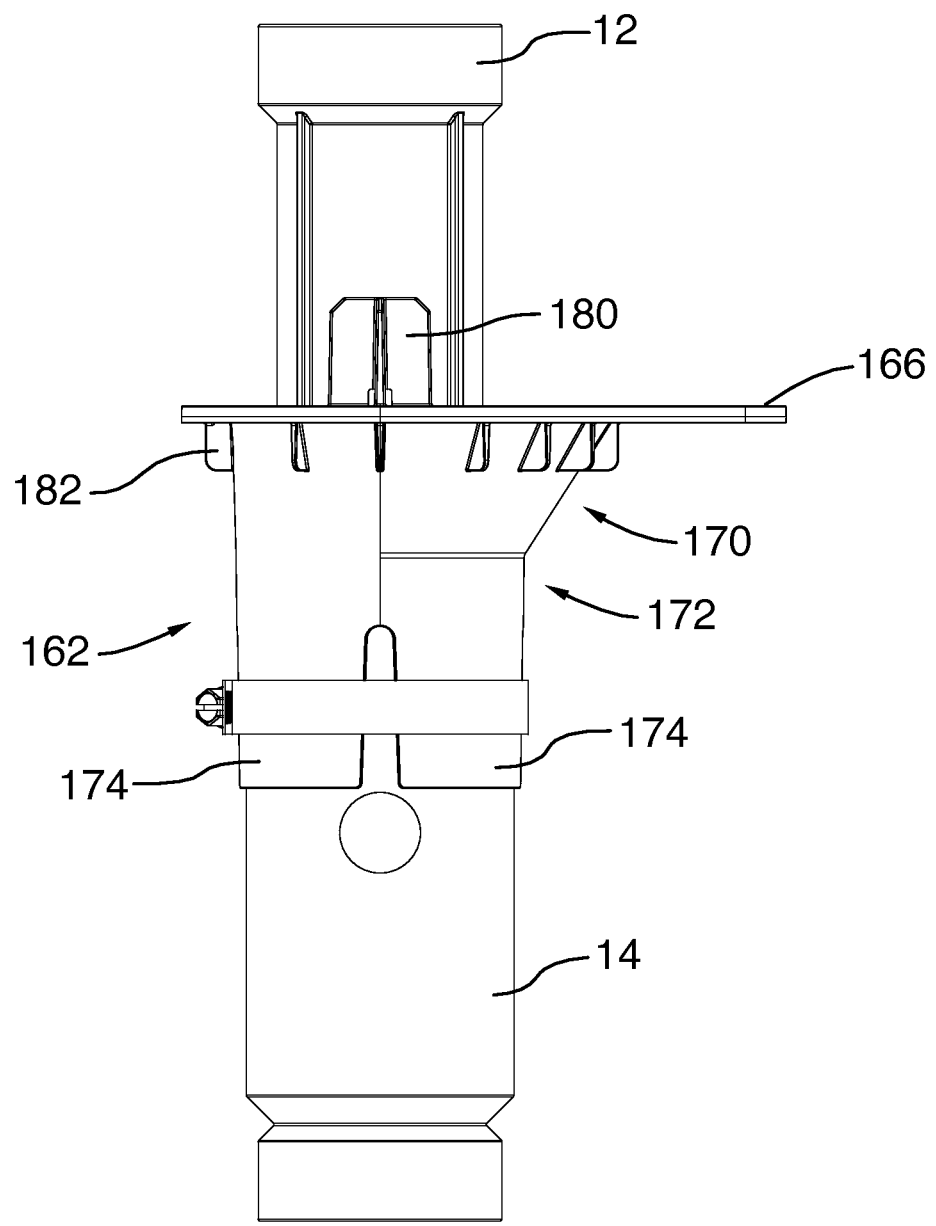
FIG. 20 is a second side view of the connector assembly of FIG. 16 with the pipe connector, the clamping member and the two pipes assembled.

FIG. 15 schematically illustrates a pipe connector 100 for connecting a female pipe 102 and a male pipe 104, according to the prior art. The pipe connector 100 comprises a cylindrical pipe body 106 extending between a top end and a bottom end, a cylindrical flange 108 protruding outwardly from the top end of the pipe body 106, a female pipe receiving cavity 110, a male pipe receiving cavity 112, and a sealing joint 114 such as an O-ring joint. The cylindrical cavity 110 emerges from the bottom end of the pipe body 106 and is adapted to receive the pipe 102. The cylindrical cavity 112 emerges from the top end of the pipe body 106 and is adapted to receive the pipe 104. The cavities 110 and 112 are connected together so that, when the pipe 102 is inserted into the cavity 110, the pipe 104 may be inserted into the cavity 112 and extend within the pipe 102. The circular sealing joint 114 is secured on the internal surface of the cavity 112 adjacent to the cavity 114. The sealing joint 114 is used to prevent water leakage by preventing water to flow between the external surface of the pipe 104, when inserted into the cavity 112, and the internal surface of the cavity 112. When connecting the pipes 102 and 104 using the pipe connector 100, glue is deposited on the top end of the pipe 102 which is inserted into the pipe 102 until abutment against the surface 116, in order to fixedly secure the pipe 102 into the cavity 110. Then, the pipe 104 is inserted into the cavity 112 until a portion of the pipe 104 be located inside the pipe 102. If too much glue is deposited on the top end of the pipe 102, some glue may leak on the sealing joint 114. The glue covering the sealing joint 114 then dries and affects the functioning of the sealing joint which will no more offer a hermetical sealing between the pipe 102 and the internal surface of the cavity 112. Therefore, water leakage may occur.

When connecting the pipes 12 and 14 together using the present pipe connector 10, no glue is used for securing the pipe 14 to the pipe connector 10. Instead, a clamping device 18 is used for securing the pipe 14 to the retaining fingers 40. Since no glue is used, there is therefore no risk of glue leakage and no risk that the glue damages the joint 54.

In one embodiment, the above-described pipe connector is used for connecting the drain of a freestanding bathtub to a discharge pipe or drain. While using usual pipe connectors and usual methods for connecting a freestanding bathtub to a discharge drain, it is usually necessary to cut the finished ceiling located below the bathtub in order to access the pipes connected to the bathtub. Using the present pipe connector and present method for connecting a freestanding bathtub to a discharge drain, the step of cutting the finished ceiling may be omitted. Therefore, this facilitates the installation of the freestanding bath tub since no measurements are required in addition to be time efficient. The present pipe connector also allows for an easy access in the event of any repair should be done.

It should be understood that the above-described pipe connector may be modified without departing from the scope of the present description. For example, while it has a circular cross-sectional shape, it should be understood that the side wall 20 may have any other adequate cross-sectional shape such as a square or rectangular cross-sectional shape.

In one embodiment, the side aperture 48 is omitted and an L-shaped screw driver may be used for tightening the hose clamp 18.

While the present description refers to a hose clamp 18 for tightening the retaining fingers 40 against the pipe 14, it should be understood any clamping member for substantially securing the retaining fingers to the pipe 14 may be used. For example, a spring clamp or a cable tie may be used for tightening the retaining fingers 40 against the pipe 14. In another example, the surface of the retaining fingers 40 facing the side wall 20 may be provided with a thread and a threaded bolt is used to tighten the resilient retaining fingers against the pipe 14. In a further example, two adjacent retaining fingers 40 separated by a gap may be each provided with a protrusion extending radially toward the internal face of the side wall 20. For each retaining finger, the respective protrusion is located near or at the edge of the retaining finger 40 adjacent to the gap, and each protrusion comprises an aperture. At least one of the apertures is threaded so that a bolt for example may be screwed thereto. The bolt is inserted through the aperture of one protrusion and then screwed into the threaded aperture of the other protrusion. By screwing the bolt, the gap between the two adjacent retaining fingers is reduced and the retaining fingers are tightened against the pipe 14.

In one embodiment, the portion of the flanges to be in contact with the pipe 12 is provided with a material that increases the friction with the pipe 12. For example, rubber may be fixed on the flanges 46.

It should also be understood that the number and the characteristics of the retaining fingers 40 may change as long as the guiding structure 38 comprises at least one resilient retaining finger adapted to receive the pipe 14 therebetween and to be secured to the pipe when tightened by a clamping member. For example, the cross-sectional shape, the length along the longitudinal axis, the width and thickness of the retaining fingers may vary.

While the aperture 36 and the guiding structure 38 are centered with respect to the side wall 20, it should be understood that other configurations are possible as long as the aperture 36 and the guiding structure 38 are aligned together.

The shape, dimensions, and number of the secondary holes 52 may also vary. In one embodiment, the secondary holes may be omitted.

While it has a truncated conical shape, it should be understood that the bottom wall 30 may have any other adequate shape. For example, the bottom wall 30 may extend within a plane orthogonal to the longitudinal axis to have a disk shape provided with a central aperture.

While in the illustrated embodiment, the guiding structure 38 extends upwardly from the bottom wall 30, it should be understood that other configurations may be possible. For example, the bottom wall 30 may be seen as a platform secured to the side wall 20 and extending within the interior space defined by the side wall 20. The platform is therefore provided with the central aperture 36 and the guiding assembly extends upwardly therefrom. The platform may optionally be provided with secondary holes, such as secondary holes 52. It should be understood that the platform may have any adequate shape and be positioned at any adequate position along the length of the side wall as a long as the guiding assembly does not extend above the flange 26.

In one embodiment, the guiding assembly 38 extends upwardly from the platform, i.e. towards the end 22 of the side wall 20. In this case, the location of the platform along the length of the side wall 20 and the length of the guiding assembly 38 are chosen so that the guiding assembly does extend above the flange 26.

In another embodiment, the guiding assembly 38 extends downwardly from the platform, i.e. towards the end 24 of the side wall 20. In this case, the guiding structure may extend below the end 24 of the side wall 20.

In a further embodiment, the retaining fingers as those described in FIG. 1 extends below the end 24 of the side wall 20 in order to further stabilize the vertical position of the pipe 14 and/or 12.

It should be understood that any adequate device for securing the guiding assembly 38 to the interior surface of the side wall 20 may be used. For example, the bottom end 42 of each retaining finger 40 may be secured to a ring, and the ring may be secured to the interior surface of the side wall 20 via arms that each extend from the ring to the side wall 20.

In one embodiment, the position of the flange 46 is chosen as a function of a desired position for the top end of the pipe 14 relative to the floor. This is achieved by choosing the dimensions of the pipe connector 10, and more particularly the dimensions along the longitudinal or vertical axis, so that the distance between the bottom surface of the flanges 46 and the bottom surface of the flange 26 substantially corresponds to a desired and predetermined distance between the top end of the pipe 14 and the top surface of the floor, when the pipe connector is installed. In this case, a technician who connects the pipe 12 and 14 together does not have to place the pipe 14 at an adequate position relative to the floor. He simply has to insert the pipe 14 into the guiding assembly 38 until the pipe 14 abuts the flanges 46 of the retaining fingers 40. In this position, the top end of the pipe 14 is then at the predetermined distance relative from the floor. For example, the pipe connector 10 may be designed so that the distance between the bottom surface of the flanges 46 and the bottom surface of the flange 26 is substantially equal to about 1.375 inches.

In one embodiment, some of the elements of the pipe connector 10 may have the following dimensions. The external diameter of the side wall 20 may be chosen so as to be inserted into a floor hole have a diameter substantially equal to 4 inches, 5 inches, 6 inches, 7 inches, 8 inches, 9, inches, 10 inches, 11 inches, or 12 inches. The length of the retaining fingers 40 along the longitudinal axis is chosen so that the retaining fingers 40 be in physical contact with the pipe 14, when inserted into the guiding assembly 38, over a length of about 1.75 inches. The length of the side wall 20 along the longitudinal axis may be substantially equal to about 2.25 inches. The diameter of the hole 36, and therefore that of the guiding assembly 38, is chosen to accommodate a pipe 14 having an external diameter of about 2.5 inches.

FIGS. 16 to 22 illustrate one embodiment of a pipe connector 150 for connecting a first pipe 12 and a second pipe 14 together and allowing the passage of a fluid therebetween. The pipe 12 is to be connected, directly or indirectly, to a bathtub (not shown) such as a freestanding bathtub, and the second pipe 14 is to be connected, directly or indirectly, to an evacuation pipe or drain (not shown) which is itself typically connected to a sewer (not shown). The pipes 12 and 14 are adapted to be inserted one into the other. In the embodiment illustrated in FIG. 16, the pipe 12 is a male part of a slip joint that can be inserted into the pipe 14, which is a female part of the slip joint. However, the person skilled in the art will understand that the pipe 14 and the pipe 12 may be the male part and the female part of the slip joint, respectively.

In one embodiment, the pipe connector 150 is adapted to be inserted into a hole defined in a floor on which a bathtub is to be placed and secured. Once inserted in the floor hole, the pipe connector 150 is fixedly secured to the floor, using screws, construction adhesive and/or the like. The pipe connector 150 is adapted to receive the first and second pipes 12 and 14 while the pipe 12 is inserted at least partially into the pipe 14, and to maintain the position of the pipes 12 and 14 relative to the floor.

As illustrated in FIG. 6, the pipe connector 150 comprises an elongated body 152, a guiding assembly 154, and a clamping device 18. In the illustrated embodiment, the elongated body 152 includes an elongated side wall 158 extending along a longitudinal axis between a first or top end 160 and a second or bottom end 162 to define a cavity or interior space therein. The top end 160 defines an aperture 164 through which the first pipe 12 can be inserted, as it will become apparent below. A flange 166 extends laterally and outwardly from the first end 160 of the side wall 158. The flange 166 extends along at least a portion of the perimeter of the first end 160 of the side wall 158. The flange 166 has a plurality of holes 168 distributed along a surface thereof and extending through a thickness thereof.

The elongated body 152 comprises a first section 170 and a second section 172. The first section 170 has a truncated substantially-conical shape and extends longitudinally along the longitudinal axis from the top end 160 away from the flange 166 and towards the bottom end 162. The portion of the side wall comprised in the first section is substantially conical so as to guide the pipe 12 towards the second section 172 when the pipe 12 is downwardly inserted into the aperture 164. The second section 172 has a substantially cylindrical shape and extends longitudinally along the longitudinal axis from the first section 170 towards the bottom end 162. The second section 172 has a circular cross-section of which the diameter substantially corresponds to the external diameter of the pipe 14.

The guiding assembly 154 extends longitudinally and downwardly along the longitudinal axis from the second section 172. The guiding assembly 154 comprises four resilient retaining fingers 174 that are substantially evenly distributed about the circumference of the second section 172 at a bottom end thereof. The resilient fingers 174 are spaced apart from one another and each define an arc of a circle such that the space defined between four retaining fingers 174 has a substantially cylindrical shape of which the diameter substantially corresponds to that of the second section 172. More specifically, each retaining finger 174 has a circular arc cross-sectional shape and the radius of curvature of the circular arc substantially corresponds to that of the second section 172. Each retaining finger 174 extends substantially downwardly, parallel to the longitudinal axis from the bottom end 162 of the second section 172. The top end of each retaining finger 174 is fixedly secured to the bottom end 162 of the second section 172. The retaining fingers 174 form together a substantially cylindrical cavity or aperture in which the pipe 14 is to be inserted. In one embodiment, the diameter of the cavity or aperture formed by the retaining fingers 174 substantially corresponds to the external diameter of the pipe 14. The diameter of the cavity or aperture formed by the second section 172 also substantially corresponds to the external diameter of the pipe 14.

Figure 21:
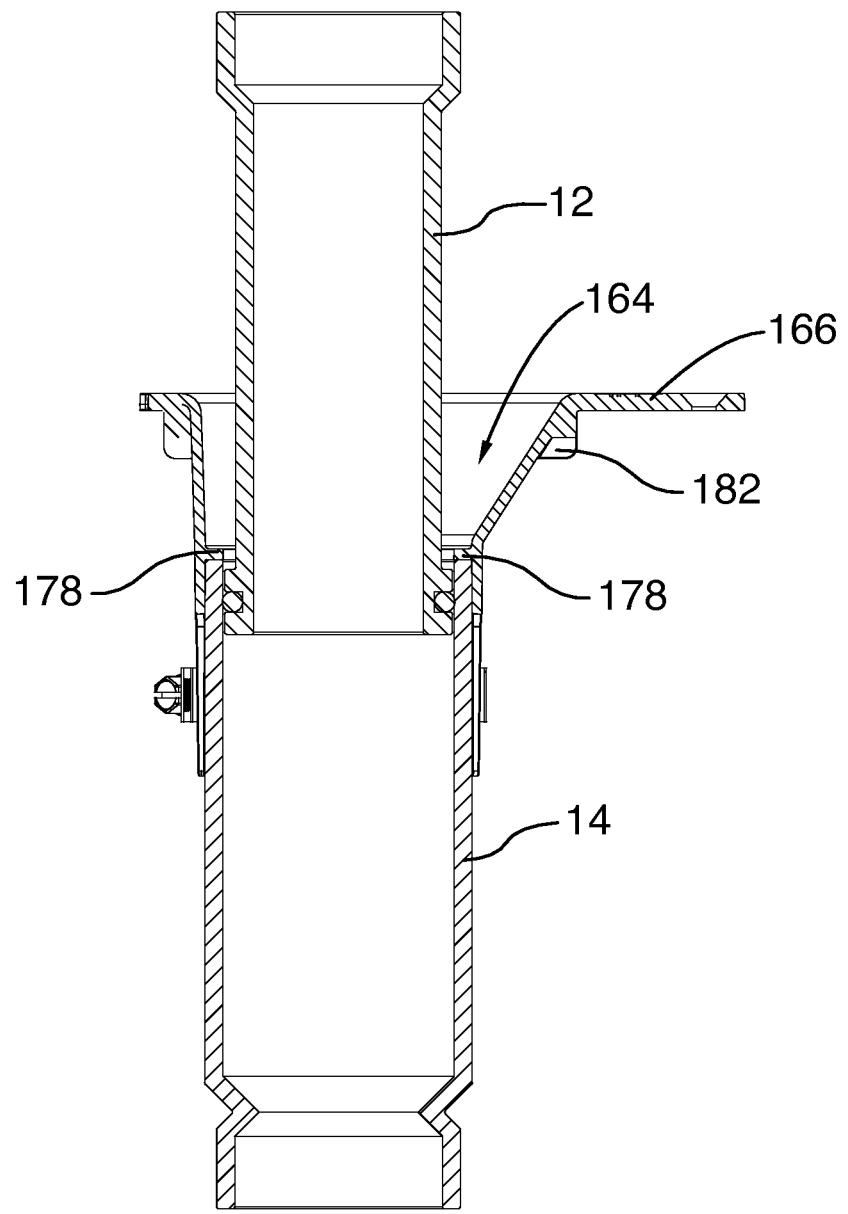
FIG. 21 is a cross-sectional side view of the connector assembly of FIG. 16 with the pipe connector, the clamping member and the two pipes assembles together.

As illustrated in FIG. 21, an internal flange 178 extends inwardly and laterally from the internal surface of the second section 172 at a top end thereof and adjacent the bottom end of the first section 170. The flange extends along a perimeter of the internal surface of the second section 170. It should be understood that the internal flange 178 may extend only along a portion of the perimeter of the internal surface of the second section 170. The internal flange 178 defines a circular aperture of which the diameter is substantially equal to or greater than the external diameter of the bottom end of the pipe 12 so that the pipe 12 may be inserted through the aperture defined by the pipe 12. Furthermore, the diameter of the circular aperture defined by the internal flange 178 is less than the external diameter of the pipe 14 but greater than the internal diameter of the pipe 14. In other words, the length of the internal flange 178 is substantially equal to or less than the thickness of the pipe 14. As a result, the internal flange 178 forms an abutment portion on which the pipe 14 may abut when inserted into the pipe connector 150. It should be understood that the length of the internal flange 178 is chosen so that the pipe 14 may abut thereagainst when inserted between the retaining fingers 174. Each retaining finger 174 is resilient so that its bottom end may move in a radial direction, inwardly and outwardly, while its top end is fixedly secured to the second section 172. Therefore, the space defined between the retaining fingers 174 is substantially adjustable.

Figure 22:
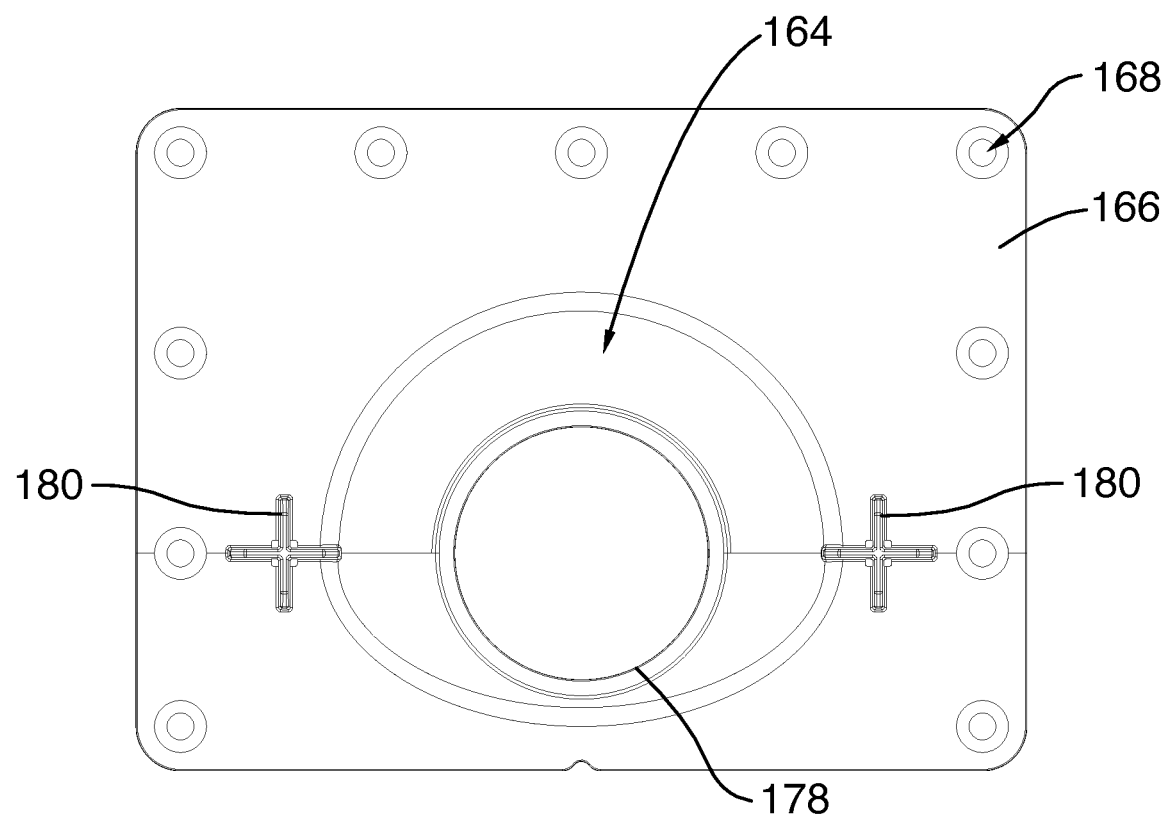
FIG. 22 is a top view of the pipe connector of FIG. 16.

As illustrated in FIG. 22, the top end of the side wall 158 that defines the opening 164 comprises a first semi-circular portion and a parabolic portion. It should be understood that the top opening 164 may be provided with any other adequate shape such as a circular shape or an ellipsoidal shape, as long as the dimension of the top opening 164 is greater than the opening formed by the second section 172 so that the portion of the side wall 158 contained in the first section be inwardly inclined in order to guide the insertion of the pipe 12 towards the first section 170 of the elongated member 152.

In one embodiment, the pipe connector 150 comprises two guiding protrusions 180 which each protrude from the flange 166 along the longitudinal axis. The guiding protrusions 180 are designed to engage corresponding holes or apertures present in the skirt of the bathtub. Once the pipe connector 150 is secured to the floor, the skirt is positioned on the floor at an adequate position relative to the pipe connector 150 so that the guiding protrusions 180 each engage their respective aperture present in the skirt.

In one embodiment, the pipe connector further comprises a plurality of blades 182 which each project radially from the portion of the side wall 158 of the first section 170, adjacent to the flange 166. The top end of each blade 182 is secured to the flange 166 while one side of each blade 182 is secured to the side wall 158. Each blade 182 has a substantially triangular shape so that the side of each blade 182 opposite to the side secured to the side wall 158 is substantially parallel to the longitudinal axis. As a result, the side opposite to the side secured to the side wall 158 is substantially vertical when the pipe connector 150 is positioned into the floor hole. The blades 182 are positioned at different locations about the perimeter of the top end 160 of the side wall 158. The dimensions and positions of the blades 182 are chosen as a function of the hole in which the pipe connector is to be received. When the pipe connector 150 is inserted into the floor hole, the side the side opposite to the side secured to the side wall 158 engages the floor and substantially prevents the pipe connector 150 from moving out of the hole.

In the following, there is described one embodiment of a method for installing a freestanding bathtub while using the pipe connector 150.

In order to install the pipe connector 150 and as described for the pipe connector 10, a hole is first made in the floor that will receive the bathtub. The location of the floor hole is selected with respect to the desired position for the bathtub. For example, the position of the hole may be chosen so that the center of the waste, overflow, or discharge pipe of the bathtub, once installed, be vertically aligned with the center of the hole defined by the retaining finger 174 once the pipe connector 150 is inserted into the floor hole. In another example, the position of the floor hole is chosen so that the center of the floor hole be substantially vertically aligned with the center of the discharge pipe of the bathtub, once installed.

The dimensions of the floor hole are chosen so that the side wall 158 be inserted into the floor hole while the flange 166 may abut the top surface of the floor surrounding the floor hole. Once the pipe connector 150 is inserted in the floor hole, the flange 166 rests on the top surface of the floor. The pipe connector 150 is then fixedly secured to the floor by screwing screws through the holes 168. It should be understood that any proper method to fixedly secure the pipe connector 150 to the floor may be used. For example, the holes 168 through the flange 166 may be omitted and the flange 166 may be secured to the floor using a construction adhesive or the like.

Once the flange 166 has been secured to the floor, the pipe 14 is inserted upwardly into the guiding assembly 154 and the second section 172. For example, the pipe 14 may be the female part of a slip joint, as illustrated in FIGS. 16 to 21. The pipe 14 slides into the guiding assembly 154 and the second section 172 until abutting against the internal flange 188 of the second section 182. The hose clamp 18 is then inserted around the guiding assembly 154, and tightened in order to secure the pipe 14 to the guiding assembly 154, as illustrated in FIGS. 17 to 20. The hose clamp 18 may be screwed to be tightened using a screwdriver. In comparison to the pipe connector 10 for which the hose clamp 18 may be accessed from above the floor, the hose clamp 18 is accessed and secured from below the floor in the case of pipe connector 150.

The remaining of the installation of pipe connections and the bathtub while using the pipe connector 150 follows substantially the same procedure as for the pipe connector 10.

As for the pipe connector 10, it should be understood that the sequence of the installation steps may change. For example, the first step may consist in inserting the pipe 14 in the guiding assembly 154 of the pipe connector 150. The second step may consist in securing the retaining fingers 174 against the pipe 14. Then, the pipe 12 is engaged into the pipe 14, and the pipe connector 150 with the pipes 12 and 14 connected thereto is then inserted into the floor hole. Finally, the flange 166 is secured to the floor.

As for the pipe connector 10, the pipe 12 may be provided with an O-ring or toric joint 54 which extends along a circumference of the external surface of the pipe 12 in the vicinity of a bottom end 56 of the pipe 12. The exterior diameter of the pipe 12 is selected so that the pipe 12 may fit into the pipe 14. The O-Ring 54 is in compression when the bottom end 56 of the pipe 12 is inserted into the pipe 14, thereby exerting pressure on the internal surface of the pipe 14 and the external surface of the pipe 12. As a result of the pressure exerted by the O-ring 54 being in compression, the pipes 12 and 14 are substantially secured together so that their relative position is substantially fixed. The O-ring 54 further acts as a sealing joint to prevent any fluid leakage from the pipe 12 towards the pipe 14.

In one embodiment, the bottom end 56 of the pipe 12 is inserted into the pipe 14 between the retaining fingers 174. In this case, the hose clamp 18 may be positioned along the guiding assembly 154 to face a portion of the pipe 12 inserted into the pipe 14. The hose clamp 18 may be positioned to be in alignment with the O-ring 54 or in the vicinity of the O-ring 54 in order to further increase the compression of the O-ring 54, thereby further securing the pipes 12 and 14 together.

As for the pipe connector 10, no glue is used for securing the pipe 14 to the pipe connector 150 when connecting the pipes 12 and 14 together. Instead, a clamping device 18 is used for securing the pipe 14 to the retaining fingers 174. Since no glue is used, there is therefore no risk of glue leakage and no risk that the glue damages the joint 54.

While the present description refers to a hose clamp 18 for tightening the retaining fingers 174 against the pipe 14, it should be understood any clamping member for substantially securing the retaining fingers to the pipe 14 may be used as described above with respect to the pipe connector 10.

In one embodiment, the portion of the retaining fingers 174 to be in contact with the pipe 14 is provided with a material that increases the friction with the pipe 14. For example, rubber may be fixed on the internal surface of the retaining fingers 174.

It should also be understood that the number and the characteristics of the retaining fingers 174 may change as long as the guiding structure 154 comprises at least one resilient retaining finger adapted to receive the pipe 14 therebetween and to be secured to the pipe 14 when tightened by a clamping member 18 or any other adequate clamping member. For example, the cross-sectional shape, the length along the longitudinal axis, the width and thickness of the retaining fingers 174 may vary.

In one embodiment, the position of the internal flange 178 along the longitudinal axis is chosen as a function of a desired position for the top end of the pipe 14 relative to the floor. This is achieved by choosing the dimensions of the pipe connector 150, and more particularly the dimensions along the longitudinal or vertical axis, so that the distance between the bottom surface of the internal flange 178 and the bottom surface of the flange 166 substantially corresponds to a desired and predetermined distance between the top end of the pipe 14 and the top surface of the floor, when the pipe connector 150 is installed. In this case, a technician who connects the pipe 12 and 14 together does not have to place the pipe 14 at an adequate position relative to the floor. He simply has to insert the pipe 14 into the guiding assembly 154 until the pipe 14 abuts the internal flange 178. In this position, the top end of the pipe 14 is then at the predetermined distance relative from the floor. For example, the pipe connector 150 may be designed so that the distance between the bottom surface of the internal flanges 178 and the bottom surface of the flange 166 is substantially equal to about 1.375 inches.

While in the present description the pipe connector 10, 150 is described in the context of connecting a bathtub to an evacuation drain, it should be understood that the pipe connection 10, 150 may be used and/or adapted for connecting a freestanding shower tub or base to an evacuation drain.

The embodiments of the invention described above are intended to be exemplary only. The scope of the invention is therefore intended to be limited solely by the scope of the appended claims.

I claim:

1. A method of connecting together a first pipe and a second pipe slidably engageable one into the other, the method comprising:
providing a pipe connector including
a side wall extending between a first end and a second end along a longitudinal axis and defining an interior space, the side wall configured to be insertable into a floor hole made into a floor,
a floor flange extending laterally and outwardly from the first end of the side wall, the floor flange configured to rest on a floor surface of the floor when the side wall is inserted into the floor hole, and
a guiding assembly secured to the side wall and comprising at least one resilient retaining finger for receiving the first pipe therebetween, the at least one resilient retaining finger being securable to the first pipe when the second pipe is engaged into the first pipe;
inserting the first pipe into the guiding assembly of the pipe connector;
securing the at least one resilient retaining finger of the guiding assembly against the first pipe;
engaging the second pipe into the first pipe;
inserting the pipe connector in the floor hole to abut the flange with the floor surface; and
securing the flange to the floor.

2. The method of claim 1, wherein said securing the flange to the floor comprises screwing screws in the floor through holes present in the floor flange.

3. The method of claim 1, wherein inserting the first pipe into the guiding assembly comprises inserting the first pipe between the at least one resilient retaining finger.

4. The method of claim 1, wherein said engaging the second pipe into the first pipe comprises inserting the second in the interior space of the side wall and sliding the second pipe into the first pipe.

5. The method of claim 1, wherein the guiding assembly extends within the interior space defined by the side wall.

6. The method of claim 1, wherein the pipe connector includes a bottom wall secured to the second end of the side wall, the bottom wall having a pipe aperture therethrough for receiving the first pipe, the guiding structure extending from the bottom wall towards the first end of the side wall and being aligned with the pipe aperture so that that the first pipe can be inserted into the guiding structure via the pipe aperture.

7. The method of claim 1, wherein at least a portion of the flange and at least a portion of the sidewall define a side aperture.

8. The method of claim 7, further comprising adjusting the pipe connector to accommodate various floor hole sizes via the side aperture.

9. The method of claim 1, wherein the at least one resilient retaining finger extends along the longitudinal axis away from the first end of the side wall, the at least one resilient retaining finger extending between a top end secured to the side wall and a bottom end.

10. The method of claim 9, wherein the side wall comprises a truncated conical portion and a cylindrical portion, the truncated conical portion being secured to the floor flange and extending along the longitudinal axis from the first end of the side wall towards the guiding assembly, and the cylindrical portion extending along the longitudinal axis from the truncated conical portion towards the guiding assembly and being secured to the truncated conical portion and the guiding assembly.

11. The method of claim 10, wherein the pipe connector includes an abutment flange extending inwardly from an internal surface of the cylindrical portion of the side wall, the first pipe abutting against the finger flange when inserted in the guiding assembly.

12. The method of claim 10, wherein the pipe connector includes a plurality of blades each extending radially from the truncated conical portion adjacent to the floor flange.

13. The method of claim 9, wherein the pipe connector includes at least one guiding protrusion extending from a top surface of the floor flange.

14. The method of claim 13, further comprising engaging the at least one guiding protrusion configured with at least one respective hole in a bathtub skirt.

15. The method of claim 14, further comprising positioning the bathtub skirt relative to the pipe connector.

16. The method of claim 1, wherein said securing the at least one resilient retaining finger of the guiding assembly against the first pipe comprises:
clamping with a hose clamp;
clamping with a spring clamp; or
fastening with a cable tie.

17. The method of claim 1, wherein the first pipe has a first end and the second pipe has a second end configured to cooperatively be received in the first end of the first pipe.

18. The method of claim 17, wherein said engaging second pipe into the first pipe comprises cooperatively receiving the second end of the second pipe in the first end of the first pipe.

19. The method of claim 17, wherein the cooperatively received second end of the second pipe and the first end of the first pipe together define a slip joint.

20. The method of claim 19, wherein the slip joint includes a sealing joint to prevent fluid leakage.

21. The method of claim 19, wherein the slip joint includes a sealing member selected from the group consisting of: an O-ring and a toric joint.

22. The method of claim 1, wherein said securing the at least one resilient retaining finger of the guiding assembly against the first pipe further comprises tightening the at least one resilient retaining finger against the first pipe via a securing member.

23. The method of claim 22, wherein the securing member comprises a hose clamp, a spring clamp, or a cable tie.

* * * * *